United States Patent
Chen et al.

(10) Patent No.: US 10,668,790 B2
(45) Date of Patent: Jun. 2, 2020

(54) INTERLAYERS COMPRISING OPTICAL FILMS HAVING ENHANCED OPTICAL PROPERTIES

(71) Applicant: SOLUTIA INC., St. Louis, MO (US)

(72) Inventors: Wenjie Chen, Amherst, MA (US);
Peter Borden Mackenzie, Enfield, CT (US); Scott Evan Pickett, Martinsville, VA (US); Kimberley Carmenia Carico, Kingsport, TN (US); Roland Claus Thielsch, Dresden (DE)

(73) Assignee: Solutia Inc., St. Louis, MO (US)

( * ) Notice: Subject to any disclaimer, the term of this patent is extended or adjusted under 35 U.S.C. 154(b) by 313 days.

(21) Appl. No.: 15/623,872

(22) Filed: Jun. 15, 2017

(65) Prior Publication Data
US 2017/0361687 A1  Dec. 21, 2017

Related U.S. Application Data

(60) Provisional application No. 62/510,028, filed on May 23, 2017, provisional application No. 62/352,225, filed on Jun. 20, 2016.

(51) Int. Cl.

| | |
|---|---|
| *B60J 3/00* | (2006.01) |
| *B60J 1/20* | (2006.01) |
| *G02B 27/00* | (2006.01) |
| *G02B 1/14* | (2015.01) |
| *G02B 5/30* | (2006.01) |
| *G02B 27/01* | (2006.01) |

(52) U.S. Cl.
CPC ............... *B60J 3/007* (2013.01); *B60J 1/20* (2013.01); *G02B 1/14* (2015.01); *G02B 5/3016* (2013.01); *G02B 5/3033* (2013.01); *G02B 5/3083* (2013.01); *G02B 27/0018* (2013.01); *G02B 27/0101* (2013.01); *G02B 2027/012* (2013.01); *G02B 2027/0194* (2013.01)

(58) Field of Classification Search
USPC ......................................................... 359/489
See application file for complete search history.

(56) References Cited

U.S. PATENT DOCUMENTS

| | | | |
|---|---|---|---|
| 2,282,026 A | 5/1942 | Bren et al. |
| 2,282,057 A | 5/1942 | Hopkins |
| 5,013,134 A | 5/1991 | Smith |

(Continued)

FOREIGN PATENT DOCUMENTS

| | | |
|---|---|---|
| EP | 2 381 281 A1 | 10/2011 |
| JP | 2015 225236 A | 12/2015 |

OTHER PUBLICATIONS

360ip "Cost-effective Solution to Eliminate Ghost Images in Head-up Displays" Brochure; 3 pages; Mar. 2016.

(Continued)

*Primary Examiner* — Collin X Beatty
*Assistant Examiner* — Grant A Gagnon
(74) *Attorney, Agent, or Firm* — Michelle Bugbee

(57) ABSTRACT

An interlayer comprising a first polymer layer, a polarization rotary optical film and optionally a second polymer layer, and multiple layer panels formed from such interlayers. The panels may exhibit desirable optical properties, including, for example, less image "ghosting," when used as part of a heads-up-display (HUD) display panel for use in automotive and aircraft applications.

20 Claims, 11 Drawing Sheets

(56) References Cited

U.S. PATENT DOCUMENTS

| | | | |
|---|---|---|---|
| 5,212,471 | A | 5/1993 | McDonald |
| 5,510,913 | A | 4/1996 | Hashimoto et al. |
| 5,708,587 | A | 1/1998 | Franck et al. |
| 5,999,314 | A | 12/1999 | Asakura et al. |
| 6,259,559 | B1 | 7/2001 | Kobayashi et al. |
| 6,952,312 | B2 | 10/2005 | Weber et al. |
| 7,355,796 | B2 | 4/2008 | Robinson |
| 7,839,574 | B2 | 11/2010 | Okada et al. |
| 7,864,431 | B2 | 1/2011 | Martin |
| 2003/0067574 | A1* | 4/2003 | Sasaki ................. G02B 5/3083 349/117 |
| 2004/0065229 | A1 | 4/2004 | Papenfuhs |
| 2005/0012682 | A1* | 1/2005 | Jenson ............... G02B 27/0101 345/7 |
| 2006/0094803 | A1 | 5/2006 | D'Errico |
| 2007/0154718 | A1 | 7/2007 | Silverman et al. |
| 2007/0164262 | A1 | 7/2007 | Hirono |
| 2007/0217010 | A1 | 9/2007 | Lippey |
| 2008/0044666 | A1* | 2/2008 | Anderson ......... B32B 17/10018 428/441 |
| 2008/0129073 | A1 | 6/2008 | Nishikawa |
| 2009/0153962 | A1 | 6/2009 | Okada et al. |
| 2009/0295681 | A1 | 12/2009 | Kaminski et al. |
| 2010/0060985 | A1 | 3/2010 | Kamada et al. |
| 2010/0315577 | A1 | 12/2010 | Li et al. |

OTHER PUBLICATIONS

Eastman Chemical Company; "XIR Automotive Films—Solar Control Technology" Technology Data Sheet; 2013; 2 pages.

Hecht, Eugene; "4.4 Refraction" and "4.6 The Electromagnetic Approach"; Optics, Third Edition; 1998; pp. 101 and 113.

Meade, John; "Optimizing the Solar Control Properties of Architectural Laminated Glass with Solar Absorbing Interlayers and IR Reflective Films" Glass Performance Days (South America) 2012; 6 pages.

Wade, Bruce; "Vinyl Acetal Polymers"; Encyclopedia of Polymer Science and Technology; 2016; pp. 1-22.

Notification of Transmittal of the International Search Report and the Written Opinion of the International Searching Authority, or the Declaration received in International Application No. PCT/US2017/038228 dated Oct. 13, 2017.

Co-pending U.S. Appl. No. 15/623,852, filed Jun. 15, 2017, now U.S. Publication No. 2017-0361579; Wenjie Chen, et al.

Co-pending U.S. Appl. No. 15/623,895, filed Jun. 15, 2017, now U.S. Publication No. 2017-0363863; Wenjie Chen Office Communication notification dated Jun. 14, 2019 received in co-pending U.S. Appl. No. 15/623,895.

Office Communication notification dated Jun. 27, 2019 received in co-pending U.S. Appl. No. 15/623,852.

* cited by examiner

FIG. 1(a)
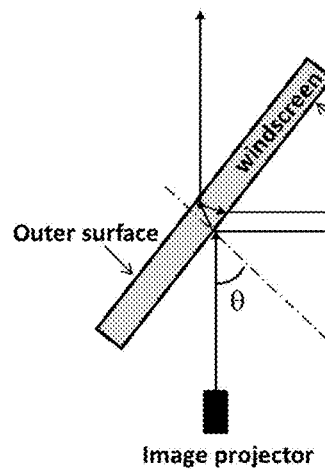
FIG. 1(b)
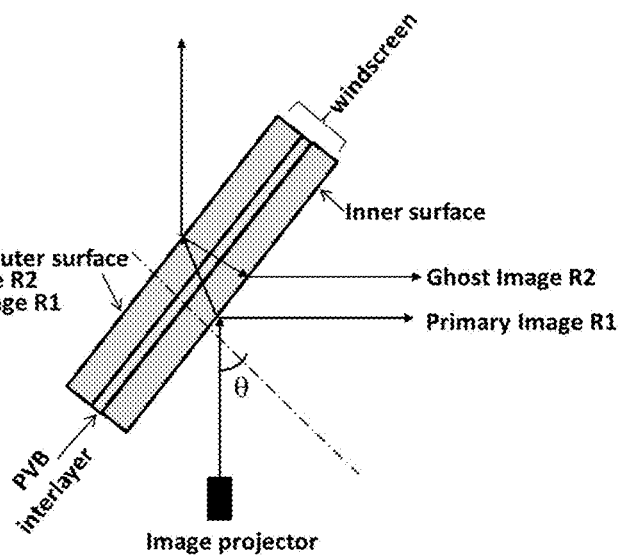
FIG. 2(a)   FIG. 2(b)   FIG. 2(c)
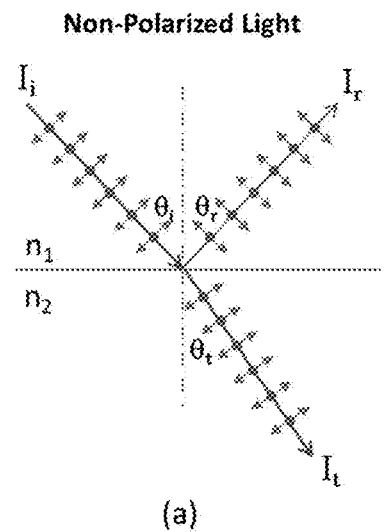
(a)
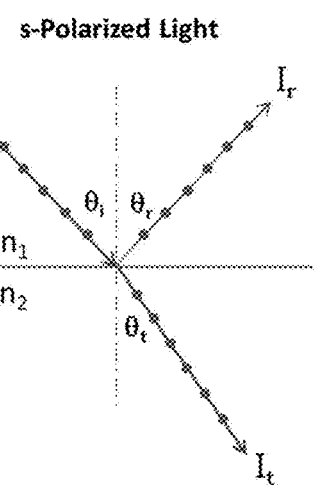
(b)
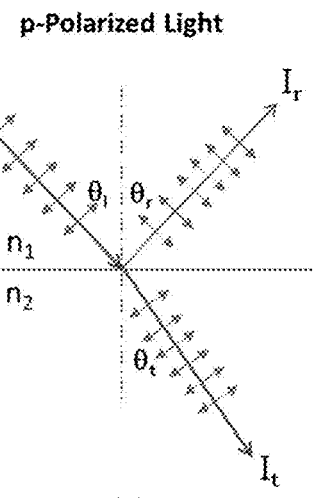
(c)

FIG. 3(a)　　　FIG. 3(b)　　　FIG. 3(c)
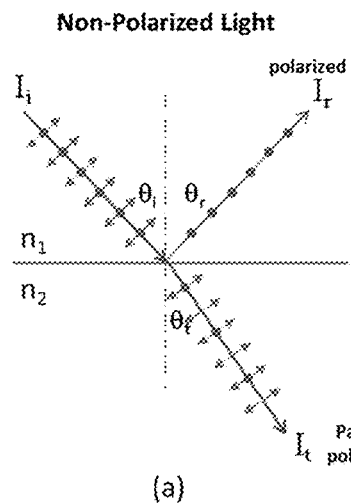
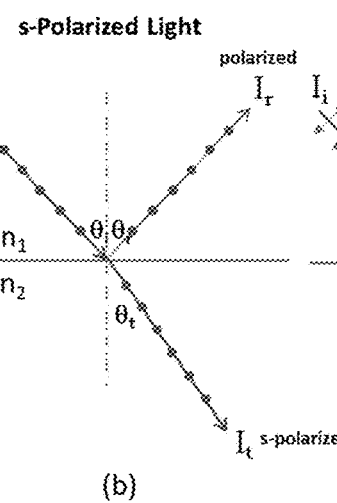
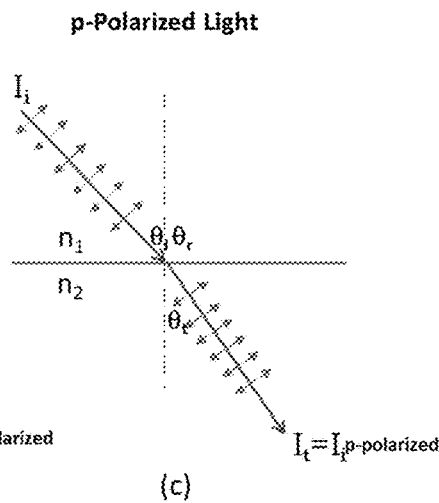
FIG. 4
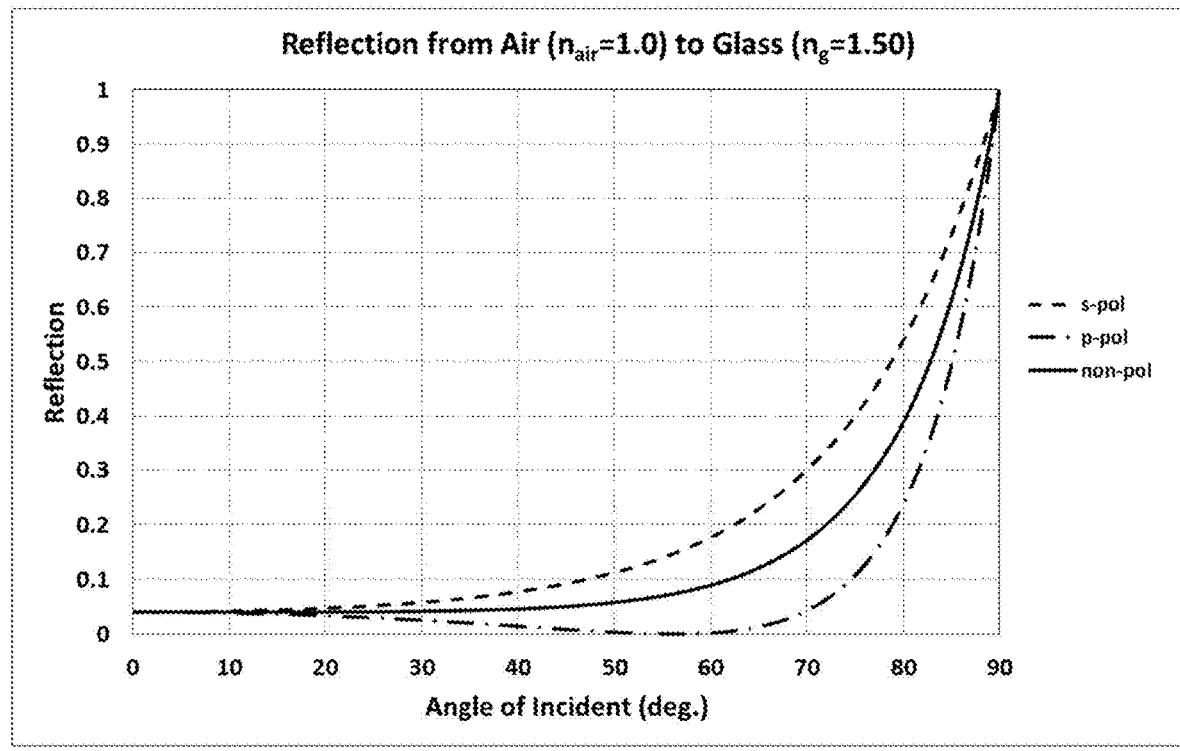

(a)

(b)

FIG. 13
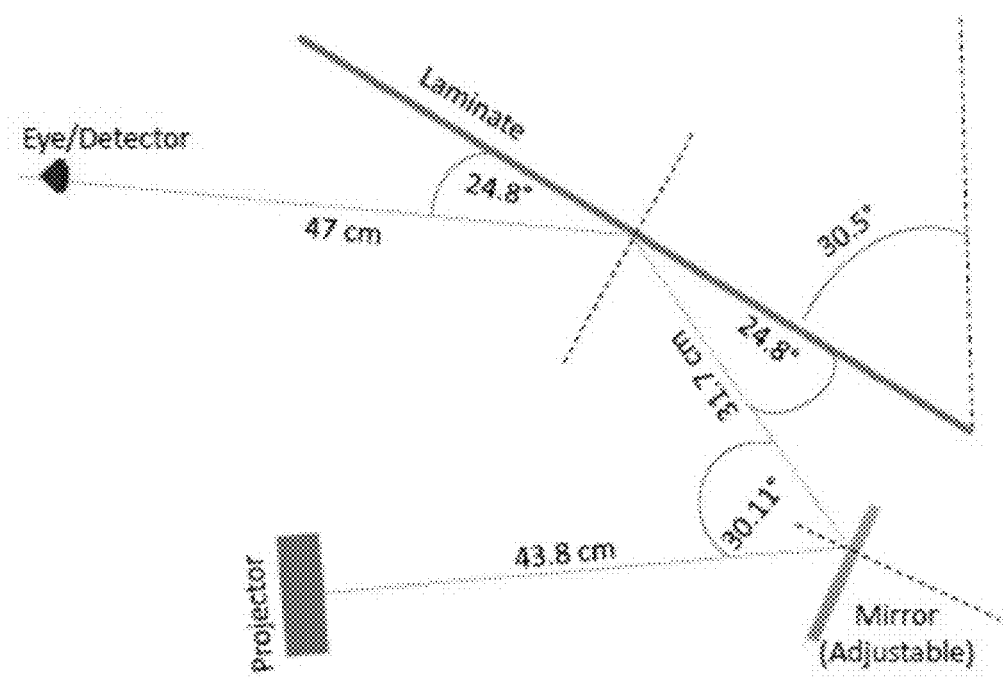
FIG. 14(a)
FIG. 14(b)
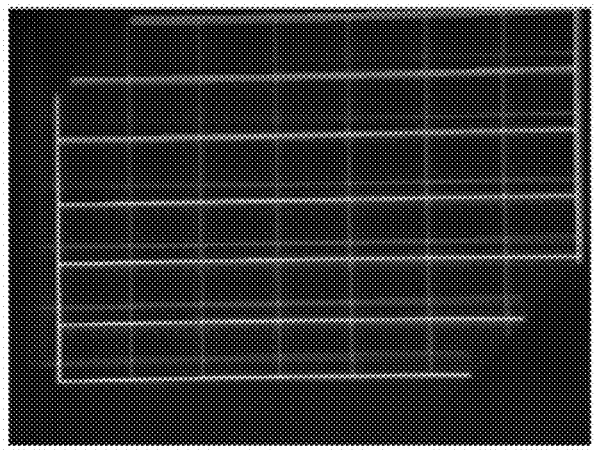
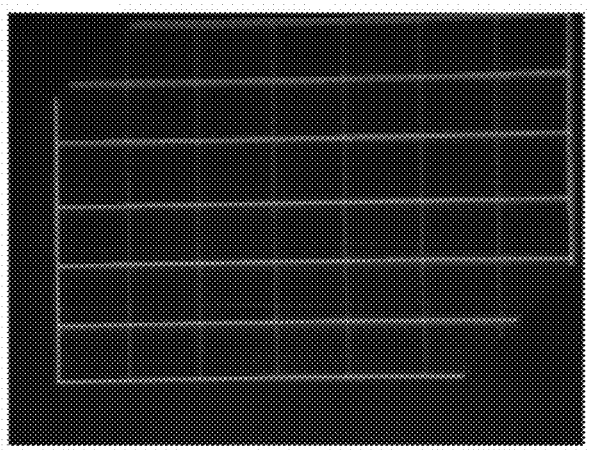
(a)
(b)

INTERLAYERS COMPRISING OPTICAL FILMS HAVING ENHANCED OPTICAL PROPERTIES

CROSS REFERENCE TO RELATED APPLICATIONS

This application claims the benefit of U.S. Provisional Patent Application Ser. No. 62/352,225, filed Jun. 20, 2016, and U.S. Provisional Patent Application Ser. No. 62/510,028, filed May 23, 2017, the entire disclosures of which are incorporated by reference herein.

BACKGROUND

1. Field of the Invention

This disclosure relates to polymer resins and, in particular, to polymer resins suitable for use in polymer layers that are suitable in interlayers, including those utilized in multiple layer panels, such as windshields, and multilayer panels having improved optical properties, such as reduced ghost imaging.

2. Description of Related Art

Poly(vinyl butyral) ("PVB") is often used in the manufacture of polymer sheets that can be used as polymer layers, such as for interlayers for use in multiple layer panels, including, for example, light-transmitting laminates such as safety glass or polymeric laminates.

Safety glass generally refers to a transparent laminate that includes at least one polymer sheet disposed between two sheets of glass. Safety glass is often used as a transparent barrier in architectural and automotive applications, and one of its primary functions is to absorb energy resulting from impact or a blow without allowing penetration of the object through the glass and to keep the glass bonded even when the applied force is sufficient to break the glass. This prevents dispersion of sharp glass shards, which minimizes injury and damage to people or objects within an enclosed area. Safety glass may also provide other benefits, such as a reduction in ultraviolet ("UV") and/or infrared ("IR") radiation, and it may also enhance the aesthetic appearance of window openings through addition of color, texture, and the like. Additionally, safety glass with desirable acoustic properties has also been produced, which results in quieter internal spaces.

Laminated safety glass has been used in vehicles equipped with heads-up display ("HUD") systems (also referred to as head-up systems), which project an image of an instrument cluster or other important information to a location on the windshield at the eye level of the vehicle operator. Such a display allows the driver to stay focused on the upcoming path of travel while visually accessing dash board information. Generally, the HUD system in an automobile or an aircraft uses the inner surface of the vehicle windscreen to partially reflect the projected image. However, there is a secondary reflection taking place at the outside surface of the vehicle windscreen that forms a weak secondary image or "ghost" image. Since these two reflective images are offset in position, double images are often observed, which cause an undesirable viewing experience to the driver. When the image is projected onto a windshield which has a uniform and consistent thickness, the interfering double, or reflected ghost, image is created due to the differences in the position of the projected image as it is reflected off the inside and outside surfaces of the glass.

One method of addressing these double or ghost images is to include a coating, such as a dielectric coating, on one of the surfaces of the windshield between the glass and the interlayer. The coating is designed to produce a third ghost image at a location very close to the primary image, while significantly reducing the brightness of the secondary image, so that the secondary image appears to blend into the background. Unfortunately, at times, the effectiveness of such a coating can be limited and the coating itself may create other issues, such as it may interfere with the adhesion of the interlayer to the glass substrates, resulting in optical distortion and other issues.

Another method of reducing ghost images in windshields has been to orient the inner and outer glass panels at an angle from one another. This aligns the position of the reflected images to a single point, thereby creating a single image. Typically, this is done by displacing the outer panel relative to the inner panel by employing a wedge-shaped, or "tapered," interlayer that includes at least one region of nonuniform thickness. Many conventional tapered interlayers include a constant wedge angle over the entire HUD region, although some interlayers have recently been developed that include multiple wedge angles over the HUD region.

The problem with tapered interlayers is that the wedge angle(s) required to minimize the appearance of ghost images depends on a variety of factors, including the specifics of the windshield installation, the projection system design and set up, and the position of the user, as further described below. Many tapered interlayers are designed and optimized for a single set of conditions unique to a given vehicle. Further, the set of optimization conditions usually includes an assumed driver position (or nominal drive height), including driver height, distance of the driver from windshield, and the angle at which the driver views the projected image. While a driver of the height at which the windshield was optimized may experience little or no reflected double images or ghost images, drivers taller and shorter than the nominal driver height may experience significant ghost imaging.

Further, wedge shaped or tapered interlayers can be difficult to handle efficiently. Since the interlayer does not have a constant or uniform thickness profile (that is, a portion of the interlayer is thicker than the rest of the interlayer), when producing the interlayer and winding it onto a roll, the roll is not cylindrical in shape. If the wedge is a constant wedge, the roll may be conical in shape. This makes it difficult to handle, transport and store.

Thus, a need still exists for a windshield or windscreen suitable for use in HUD systems that does not have ghost or double images that is suitable for multiple types of vehicles and different drivers. There is therefore a need for interlayers and windshields utilizing such interlayers that are suitable for use with HUD projection systems that do not utilize wedge or tapered polymer layers or interlayers, and for which double (ghost) image is reduced or eliminated for drivers of all heights. Such interlayers should exhibit desirable optical, acoustic, and visual properties, while reducing/eliminating double image. A need also exists for interlayers that eliminate or reduce ghost images at all incident angles and at broadband visible light and to eliminate or reduce the brightness of the double image as low as possible.

SUMMARY

One embodiment of the present invention relates to an interlayer comprising: a first polymer layer comprising a poly(vinyl acetal); a polarization rotary optical film; and a second polymer layer comprising a poly(vinyl acetal); wherein the optical film is disposed between the first polymer layer and the second polymer layer, and wherein the optical film has a first barrier coating on a first side in contact with the first polymer layer and a second barrier coating on a second side in contact with the second polymer layer.

Another embodiment of the present invention relates to an interlayer comprising: a first polymer layer comprising a poly(vinyl acetal); a polarization rotary optical film comprising a cellulose ester, a polycarbonate, a co-polycarbonate, a cyclic olefin polymer, a cyclic olefin copolymer, a polyester, a co-polyester, a polymerized thermotropic liquid crystal, a dried lyotropic liquid crystal and combinations thereof; and a second polymer layer comprising a polymer other than a poly(vinyl acetal); wherein the optical film is disposed between the first polymer layer and the second polymer layer, and wherein the optical film has a first barrier coating on a first side in contact with the first polymer layer.

Still another embodiment of the present invention relates to an interlayer comprising: a first polymer layer comprising a poly(vinyl acetal); a polarization rotary optical film; and a second polymer layer comprising a poly(vinyl acetal); wherein the optical film is disposed between the first polymer layer and the second polymer layer, and wherein the optical film has a first barrier coating on a first side in contact with the first polymer layer and a second barrier coating on a second side in contact with the second polymer layer, wherein the first barrier coating and the second barrier coating comprise a UV curable coating.

Another embodiment of the present invention relates to windshield comprising a pair of rigid substrates and the interlayer of the present invention, wherein the interlayer is disposed between the pair of rigid substrates. In embodiments, the windshield exhibits a projected image in which the intensity ratio of the primary image to the second (ghost) image is greater than 5.

Still another embodiment of the present invention relates to a method of making the interlayer of the present invention.

In embodiments, the optical film is selected from cellulose esters, polycarbonates, co-polycarbonates, cyclic olefin polymers, cyclic olefin copolymers, polyesters, co-polyesters, polymerized thermotropic liquid crystals, dried lyotropic liquid crystals and combinations thereof.

In embodiments, the first barrier coating comprises a UV curable coating. In embodiments, the second barrier coating comprises a UV curable coating. In embodiments, both the first barrier coating and the second barrier coating comprise a UV curable coating. In embodiments, the first and second barrier coatings are the same.

In embodiments, the first barrier coating is an acrylate coating. In embodiments, the second barrier coating is an acrylate coating. In embodiments, both the first barrier coating and the second barrier coating comprise an acrylate coating. In embodiments, the first and second barrier coatings are the same.

In embodiments, the optical film comprises two quarter wave plates, and wherein each quarter wave plate has a barrier coating on one side. In embodiments, the two quarter wave plates are adhered to each other using an adhesive selected from polyurethanes, polyacrylates, polyesters, polybutenes, and the like and combinations thereof, and wherein the adhesive is not in contact with the barrier coating on the quarter wave plates.

In embodiments, the optical film comprises a half wave plate having the first barrier coating on the first side and the second barrier coating on the second side.

In embodiments, the compressive shear adhesion between the polymer layer and the optical film is at least 5.5 MPa (as measured by the compressive shear adhesion test.

In embodiments, the second polymer layer is polyurethane or poly(ethylene-co-vinyl acetate).

BRIEF DESCRIPTION OF THE DRAWINGS

Various embodiments of the present invention are described in detail below with reference to the attached drawing Figures, wherein:

FIG. 1(a) shows an example of the primary and ghost images in a HUD system in a windscreen without a polymer layer;

FIG. 1(b) shows an example of the primary and ghost images in a HUD system in a windscreen with a polymer layer;

FIG. 2(a) shows light reflection and refraction at the material refractive index interface ($n_1$ and $n_2$) for non-polarized light;

FIG. 2(b) shows light reflection and refraction at the material refractive index interface ($n_1$ and $n_2$) for s-polarized light;

FIG. 2(c) shows light reflection and refraction at the material refractive index interface ($n_1$ and $n_2$) for p-polarized light;

FIG. 3(a) shows when the incident angle is equal to the Brewster angle ($\theta_B$), only s-polarized light can be reflected at the interface for non-polarized light;

FIG. 3(b) shows when the incident angle is equal to the Brewster angle ($\theta_B$), s-polarized light can be reflected at the interface for s-polarized light;

FIG. 3(c) shows when the incident angle is equal to the Brewster angle ($\theta_B$), no light can be reflected at the interface for p-polarized light;

FIG. 4 is an example showing the reflection at the air and glass interface for different angles of incident with s-polarized light ($R_{s\text{-}pol}$), p-polarized light ($R_{p\text{-}pol}$) and non-polarized light ($R_{non\text{-}pol}$);

FIG. 13 shows a diagram of the test geometry of a laboratory set up for analyzing HUD ghost image;

FIG. 14(a) shows a HUD test image showing the primary and ghost images generated with no polarization incident light;

FIG. 14(b) shows a HUD test image showing the primary and ghost images generated with s-polarization incident light;

DETAILED DESCRIPTION

Figure 5:
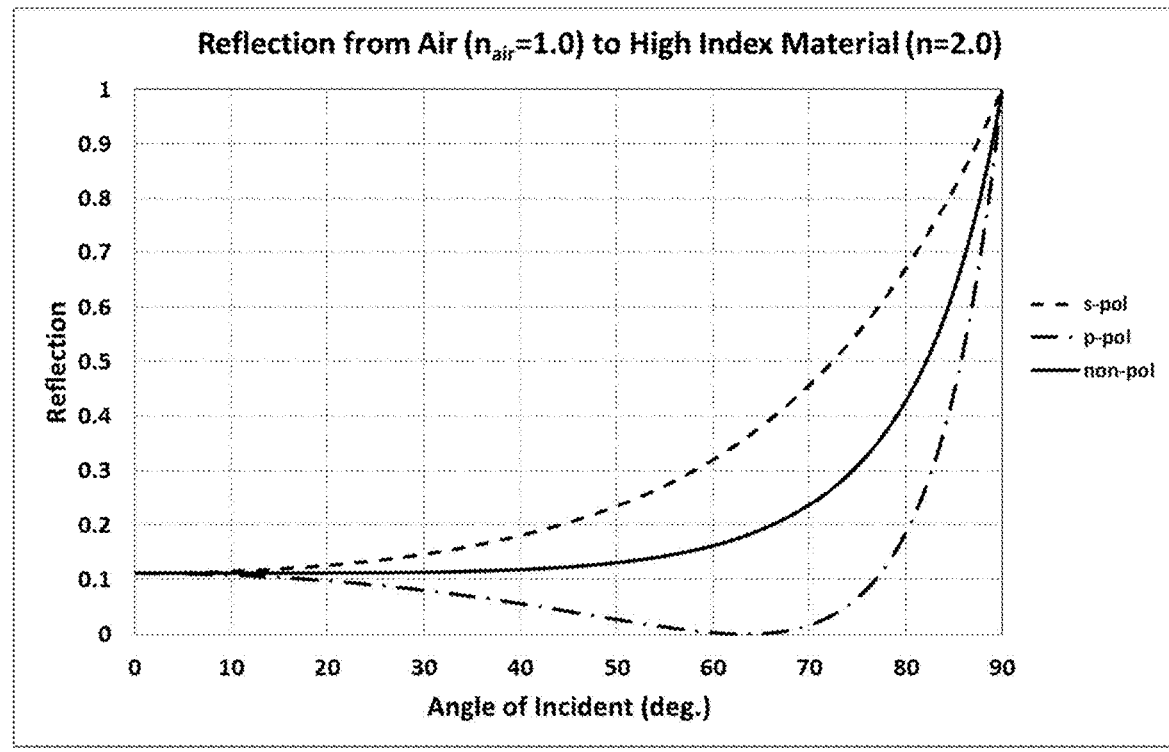
FIG. 5 shows the reflection from air to a high refractive index material (n=2.0) at different incident angles of s-, p- and non-polarized light.

Generally, a heads-up display (HUD) in an automobile uses the inner surface of the vehicle windscreen (also referred to as a windshield) to partially reflect the projected image, although the outer surface and/or a mirror can also be used. The reflection intensity (the virtual image brightness) depends on the windscreen refractive index n, incident angle θ and incident light polarization state. The larger reflection always takes place at the interface of the two different materials with the largest refraction difference. In a windscreen, the largest refractive index difference is often between air ($n_{air}$=1.0) and glass ($n_g$=1.5). Since a vehicle windscreen has two glass-air interfaces (located at the windscreen inner and outer surfaces), double images will always be observed by the driver in a standard windscreen using a HUD system. The stronger primary reflection (primary image R1) is generated from the windscreen inner surface, and the weaker secondary reflection (ghost image R2) is generated from the windscreen outer surface. FIGS. 1(a) and 1(b) show an example of the primary and ghost images in a HUD system in a windscreen without (FIG. 1(a)) and with (FIG. 1(b)) a polymer layer. If an additional high refractive index layer (or layer with a different refractive index) exists within the PVB interlayer, such as a metal coated layer (such as an XIR™ solar control layer (commercially available from Eastman Chemical Company)) for infrared ("IR") reflection, it is possible that an additional ghost image(s) could be observed at the additional interface(s).

The higher brightness of the primary image is always desired relative to the secondary ghost image, and it would be desirable to have only one bright, clear image for viewing (or in other words, to eliminate the ghost image(s)). A ghost image is undesirable for a driver's viewing experience, since it deteriorates and interferes with the primary image quality.

The behavior of a ray of light at the interface of two different materials, for example at the air ($n_{air}$=1.0) and glass ($n_g$=1.5) interface can be characterized. FIGS. 2(a) to 2(c) show light reflection and refraction at the material refractive index interface ($n_1$ and $n_2$). In FIGS. 2(a) to 2(c), $\theta_i$, $\theta_r$ and $\theta_t$ are angles of incident, reflection and transmission light, and $I_i$, $I_r$ and $I_t$ are intensities of incident, reflection and transmission light respectively. FIG. 2(a) shows the behavior of non-polarized light; FIG. 2(b) shows the behavior of s-polarized light; and FIG. 2(c) shows the behavior of p-polarized light. Generally, the incident light ($I_i$) will be both reflected ($I_r$) and transmitted ($I_t$), and its behavior follows Snell's Law: (1) $\theta_i=\theta_r$ and (2) $n_1 \sin\theta_i = n_2 \sin\theta_t$, as shown in FIGS. 2(a) to 2(c). Therefore, assuming materials having refractive indices $n_1$ and $n_2$ have no absorption, then it follows that $I_i=I_r+I_t$.

When the incident angle is equal to the Brewster angle ($\theta_i=\theta_B$=A TAN($n_2/n_1$)), only s-polarized light can be reflected at the interface (as shown in FIGS. 3(a) to 3(c), where FIG. 3(a) shows non-polarized light; FIG. 3(b) shows s-polarized light; and FIG. 3(c) shows p-polarized light). For example, the Brewster angle ($\theta_B$) is approximately 56.3° when $n_1$ is 1.0 (air) and $n_2$ is 1.5 (glass). When the incident angle ($\theta_i$) is equal to the Brewster angle ($\theta_B$), only s-polarized light can be reflected. As shown in FIG. 3(c), which shows p-polarized light, there is no reflection at the interface of the two materials. Therefore, if this condition of no reflection at the interface is satisfied at the ghost image reflection interface, the ghost image will be eliminated. Stated differently, by having no reflection at the interface, there is no second or additional image to cause a ghost or double image.

The reflection intensity depends on incident angle, refractive indices of the two materials of the interface and the incident light polarization state (i.e., s-polarization or p-polarization), which can be determined according to the Fresnel Equations:

$$R_s = \left[-\frac{\sin(\theta_i - \theta_t)}{\sin(\theta_i + \theta_t)}\right]^2 \quad \text{(Equation 1)}$$

$$R_p = \left[+\frac{\tan(\theta_i - \theta_t)}{\tan(\theta_i + \theta_t)}\right]^2 \quad \text{(Equation 2)}$$

FIG. 4 is an example showing the reflection at the air and glass interface for different angles of incident with s-polarized light ($R_{s-pol}$), p-polarized light ($R_{p-pol}$) and non-polarized light ($R_{non-pol}$). As shown in FIG. 4, (1) at the same incident angle the intensity of reflection has the following relationship, $R_{s-pol} > R_{non-pol} > R_{p-pol}$; (2) the intensity of reflection of s-polarized light ($R_{s-pol}$) increases as incident angle increases; (3) the intensity of reflection of p-polarized light ($R_{p-pol}$) decreases to zero as the incident angle approaches the Brewster angle; and (4) as the incident angle becomes greater than the Brewster angle, $R_{p-pol}$ also starts to increase, and the intensity of reflection of non-polarized light is the average of $R_{p-pol}$ and $R_{s-pol}$.

Using s-polarized light for the primary reflection will result in higher reflection intensity, which means a brighter reflection image. Using p-polarized light as the ghost image reflection will greatly reduce its intensity, especially when the incident angle equals the Brewster angle ($\theta_B$), and this will essentially eliminate the ghost image.

When the interface is between air and a material having a higher refractive index (than glass), the reflection will become even brighter. FIG. 5 shows the reflection from air to a high refractive index material (such as n=2.0) at different incident angles of s-, p- and non-polarized light. When using the higher refractive index material, the corresponding Brewster angle is also shifted to a higher value) ($\theta_B$=63.4° as shown in FIG. 5. Therefore, use of a higher refractive index coating at the inner surface of a windscreen, for example, will result in a brighter reflection than that of a windscreen without the higher refractive index coating.

Figure 6:
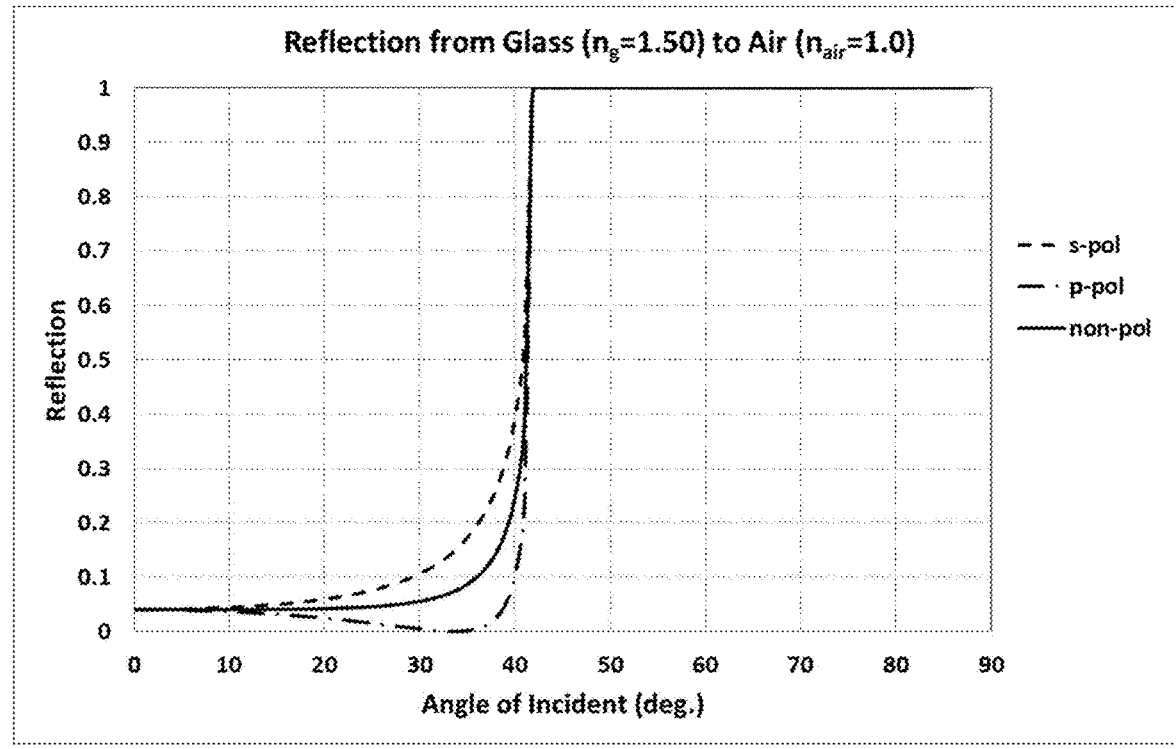
FIG. 6 shows the reflections obtained from glass to air at different incident angles of s-, p- and non-polarized light.
Figure 7:
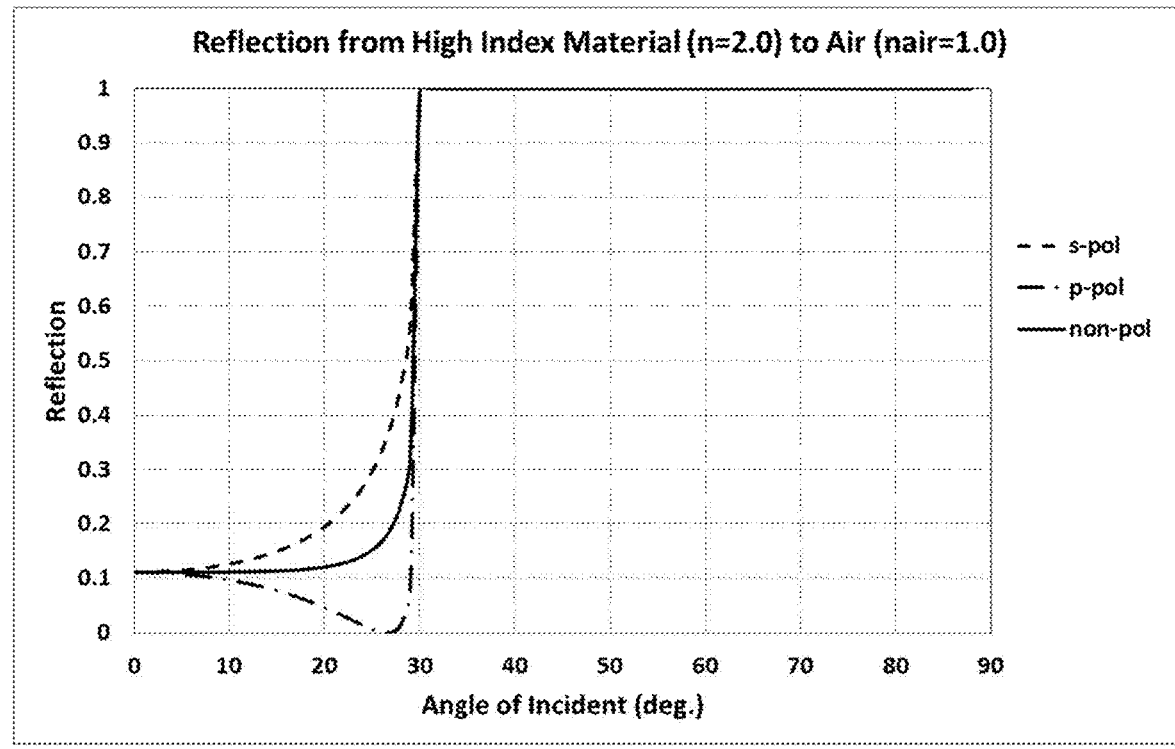
FIG. 7 shows the reflections obtained from a high refractive index material (n=2.0) to air at different incident angles of s-, p- and non-polarized light.

The plots of reflection from air to glass and from air to a material having a higher refractive index than glass material are not the same, as shown in FIGS. 4 and 5. FIGS. 6 and 7 show the reflections obtained from glass to air and from a high refractive index material (n=2.0) to air, respectively, at different incident angles of s-, p- and non-polarized light. The relationship of the intensity of the reflection $R_{s\text{-}pol} > R_{non\text{-}pol} > R_{p\text{-}pol}$ previously discussed still holds true (as shown in FIGS. 6 and 7). The behavior of these reflections will dictate the image intensity obtained from the outer surface of the windscreen, such as the ghost image (R2) shown in FIGS. 1(a) and (b). From FIGS. 6 and 7 it can be seen that the Brewster angles from glass ($n_g$=1.5) to air ($n_{air}$=1.0) and from a high refractive index material (n=2.0) to air ($n_{air}$=1.0) are different and are approximately 33.7° and 26.6°, respectively.

As shown in FIGS. 6 and 7, another special angle referred to as the critical angle ($\theta_c$), exists. The critical angle is defined as $\theta_c$=A SIN($n_2/n_1$), where $n_2$ is 1.0 and $n_1$ is 1.5 (glass) or 2.0 (high refractive index material). When the incident angle $\theta_i$ is larger than the critical angle $\theta_c$, total internal reflection will occur. When $n_1$ is 1.5 or 2.0, and $n_2$ is 1.0, the critical angle ($\theta_c$) is about 41.8° or about 30.0°, respectively.

The inventors have found that making an interlayer for use in a multiple layer panel (such as a windscreen) that has the ability to rotate or convert polarization between s- and p-polarization can significantly improve the optical quality and reduce ghost images in a laminate. A couple of methods for rotating or converting polarization include use of a half wave plate ("HWP") (or two quarter wave plates ("QWP") or any other wave plates that can be combined to form a HWP), or a 90° twisted nematic ("TN") liquid crystal structure, which are able to convert polarization between s- and p-polarization by rotating polarization about 90 degrees. The HWP rotates polarization direction 90 degrees (from s- to p-polarization or from p- to s-polarization) to eliminate the ghost image. The inventors have also discovered how to successfully include a rotatory optical film (such as a HWP or HWP equivalent or other device capable of rotating polarization) that can rotate or convert polarization into an interlayer which can then be laminated. As used herein, a "polarization rotatory optical film", a "rotatory optical film" and an "optical film" refer to a device or an optical film (such as a half wave plate) that is capable of rotating polarization, and the terms may be used interchangeably throughout.

Figure 8A:
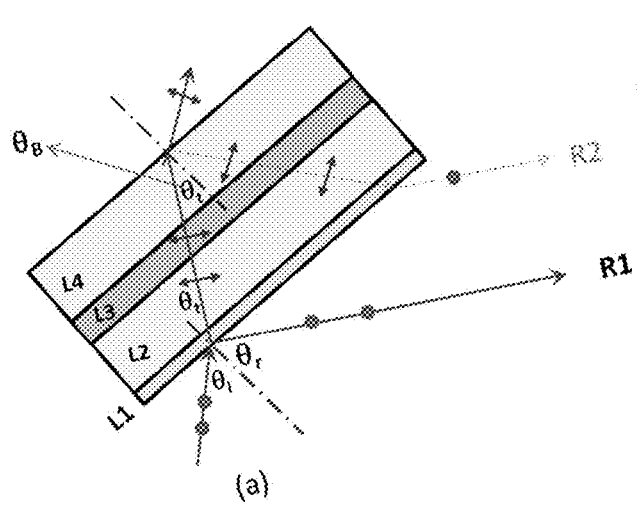
FIG. 8(a) and FIG. 8(b) demonstrate how using an optical film in a windscreen can eliminate or reduce a ghost image with s-polarized incident light.
Figure 8B:
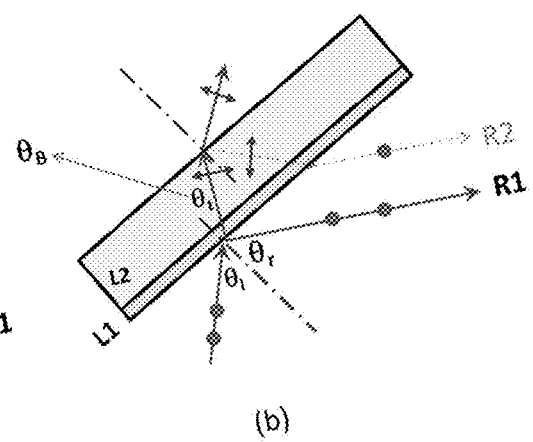

FIGS. 8(a) and 8(b) show the configuration setup for a windscreen with and without a polymer layer. Layers L2 and L4 are glass, L1 is an optical film, and L3 is a polymer layer (such as PVB) or other type of polymer layer, as further described below). FIGS. 8(a) and 8(b) demonstrate how using an optical film can eliminate or reduce a ghost image with s-polarized incident light. In the configurations shown in FIGS. 8(a) and 8(b), the incident light is s-polarized, and it is reflected back from the surface of the optical film with reflection R1. Since s-polarization light has a higher reflection than p-polarization light, the resulting image is brighter for the observer. When s-polarized light passes through the optical film and its optical axis is 45 degrees with respect to the s-polarization direction, the s-polarization will change to p-polarization. When the transmitted p-polarized light exits from the outer surface of the windscreen, and the transmitted angle, $\theta_t$, is equal to the Brewster angle, $\theta_B$, there will be no reflection taking place at the interface. Therefore, under these conditions, the ghost image, R2, is eliminated. As an example, when looking at the interface from glass to air, the Brewster angle, $\theta_B$, will be approximately 33.7°, and the back calculated incident angle, e, is about 56.3° (assuming the refractive index of the optical film is close to or equal to glass). Even if the transmitted angle, $\theta_t$, is not exactly equal to the Brewster angle, $\theta_B$, but varies within a certain range, the intensity of the reflected p-polarization light (ghost image) will remain very low.

The configurations shown in FIGS. 8(a) and 8(b) would be relatively easy to implement in practice, and they both use the inner surface of the windscreen to reflect the projected primary image. In FIGS. 8(a) and 8(b), the optical film is installed onto the windscreen inner side (on the inside surface of the glass closest to the driver), such as by an adhesive layer (not shown).

As previously discussed and as shown in FIGS. 4 and 5, the larger the incident angle θ or the higher the refractive index (n) of the material, the higher or brighter the reflected image (R1) will be. On the other hand, there are ways to increase R1 brightness, for example, a high refractive index layer can be coated on the optical film facing the observer, which could be accomplished, for example, by a deposition of a thin layer of one or more high refractive index oxides by sputtering or evaporation to increase the reflection (R1). The high refractive index coating may also be a scratch resistant hard coating.

Figure 9A:
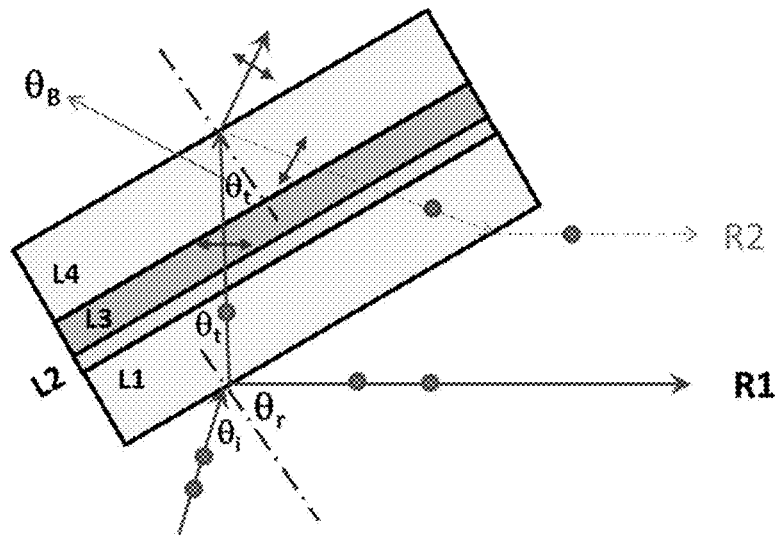
FIG. 9(a) and FIG. 9(b) show additional configuration setups for a windscreen with an interlayer to eliminate or reduce HUD ghost image with s-polarized incident light.
Figure 9B:
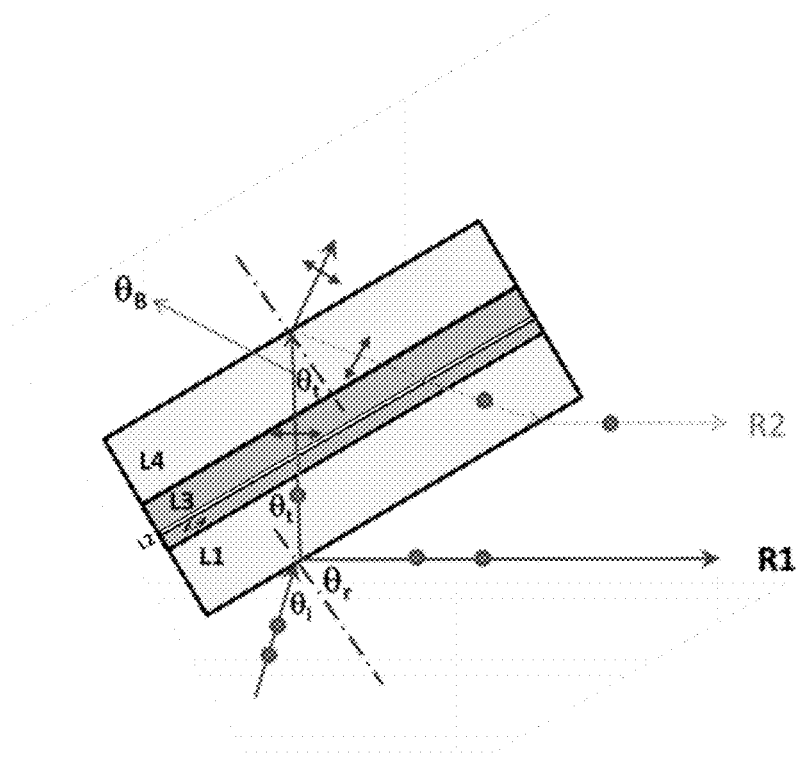

FIG. 9(a) shows another configuration setup for a windscreen with a polymer layer to eliminate or reduce the HUD ghost image with s-polarized incident light. Layers L1 and L4 are glass, layer L2 is an optical film, and layer L3 is a polymer layer such as PVB. The working principle to reduce or eliminate the ghost image in FIG. 9(a) is the same as that in FIG. 8(a), except that the optical film location is different. In FIG. 9(a), the optical film is located between the two layers of glass, such as at the inner surface of the windscreen, instead of on the outside of one layer of glass. The location of the optical film can be close to glass layer L1 as shown in FIG. 9(a) (sequence will be L1→L2→L3→L4), or alternatively, it could be close to layer L4 (sequence will be L1→L3→L2→L4). In some embodiments, the optical film can be located within (i.e., encapsulated) the polymer layer, layer L3, as shown in FIG. 9(b). For all of these cases, the s-polarized incident light will be reflected back from the inner surface of the windscreen with reflection R1.

Figure 10A:
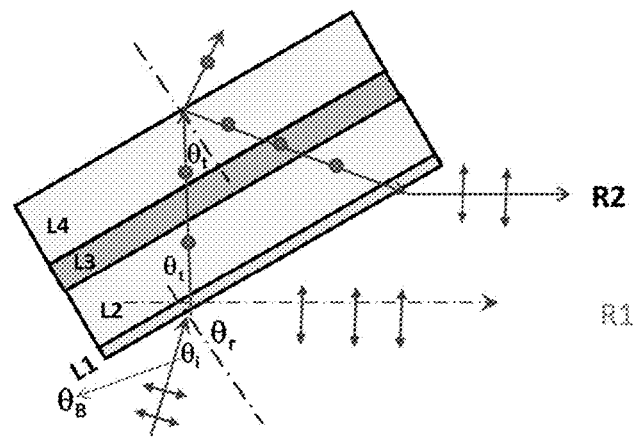
FIG. 10(a), FIG. 10(b), FIG. 10(c) and FIG. 10(d) demonstrate using the outer surface of the windscreen to reflect the projected primary image for different configurations.
Figure 10B:
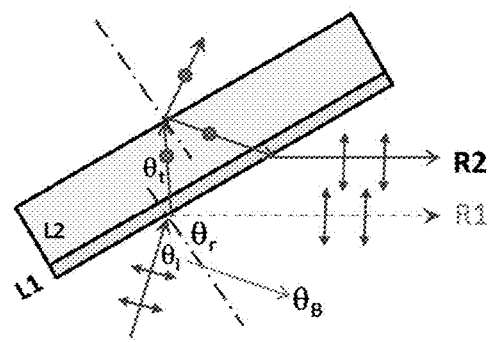
Figure 10C:
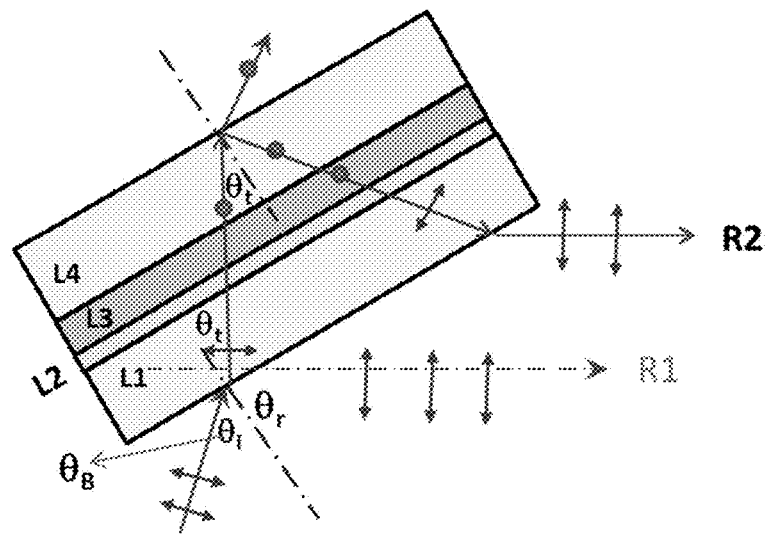
Figure 10D:
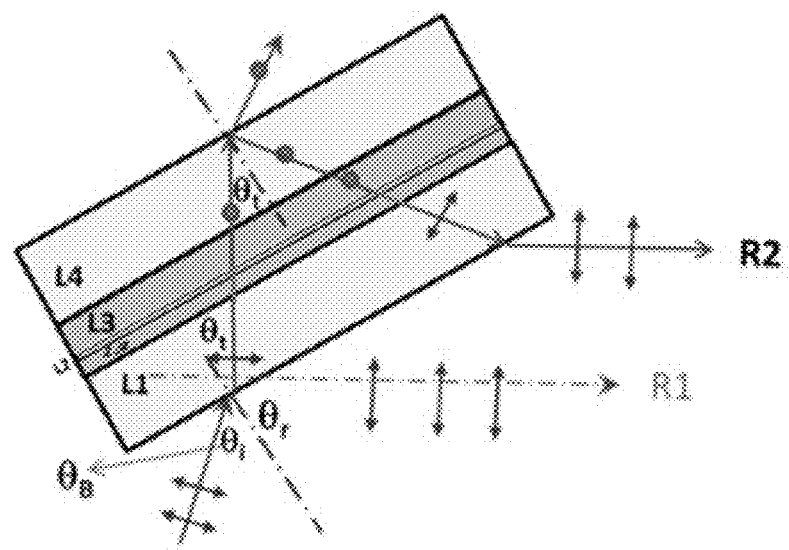

The configurations in FIGS. 10(a), 10(b), 10(c) and 10(d) demonstrate using the outer surface of the windscreen to reflect the projected primary image. FIGS. 10(a) to 10(d) have similar configurations to the windscreen with and without a polymer layer as shown in FIGS. 8(a) and 8(b) and 9(a) and 9(b). In FIG. 10(a), layer L1 is an optical film, layers L2 and L4 are glass, and layer L3 is a polymer layer; in FIG. 10(b), layer L1 is an optical film and layer L2 is glass; in FIG. 10(c), layers L1 and L4 are glass, layer L2 is an optical film, and layer L3 is a polymer layer; and in FIG. 10(d), layers L1 and L4 are glass, layers L3 are polymer layers and layer L2 is an optical film that is encapsulated between the polymer layers L3. In the configurations shown in FIGS. 10(a) to 10(d), the incident light is p-polarized incident light instead of s-polarized incident light. Since the incident angle ($\theta_i$) is equal to or close to the Brewster angle ($\theta_B$), there is no p-polarized light (ghost image R1) reflected back from the optical film or glass layers, and all the p-polarized incident light should transmit into the inner glass layer. Also, for the same reason, when the p-polarized light passes through the optical film, its polarization switches from p- to s-polarization. The strong reflection due to the s-polarization will take place at the outer glass to air interface, therefore, the outer surface of the windscreen becomes the primary image reflection surface. When the reflected s-polarized light passes through the optical film one more time, it switches back to p-polarized light (R2), which is the image observed by the driver or viewer. The reflection intensity of R2 can be characterized by the relationship shown in FIGS. 6 and 7. In this example, since the p-polarized light is parallel to the polarizing direction of polarized sunglasses, the primary image reflected back from the outer windscreen (R2) will be observed even if the driver is wearing polarized sunglasses. Also, as in the previous configurations, by having an additional high refractive index layer on the first reflection surface, such as the optical film or glass layer, the incident light Brewster angle will increase, and the refractive angle $\theta_t$ will also increase, which increases R2, the reflection intensity from the outer windscreen and air interface.

The use of polarization rotatory optical films such as half wave plates are known generally in theory, but previous uses of optical films did not describe how to optimize the optical film for use in a windscreen by selecting appropriate materials and methods of construction. Optical films that can survive the lamination process, such as a pre-laminate and autoclave process, and that are compatible with polymer layers to form fit-for-use laminated glass (windscreens or windshields) are not known. The inventors have found that by selecting proper materials for the optical film, proper lamination conditions, and proper polymer layers, an interlayer for a multiple layer panel can be made that can be used to make a visually pleasing laminated glass panel.

For a polarization rotatory optical film, it has refractive indices $n_x$, $n_y$, and $n_z$ in x-, y- and z-directions where z is the film thickness direction. If the film has a thickness, d, the definitions of the film in-plane retardation ($R_e$) and out-of-plane retardation ($R_{th}$) are shown in Equations 3 and 4 below.

$$R_e = (n_x - n_y) * d \quad \text{(Equation 3)}$$

$$R_{th} = [n_z - (n_x + n_y)/2] * d \quad \text{(Equation 4)}$$

The definition of out of plane retardation $R_{th}$ may vary depending on the particular author, particularly with regards to the sign (+/−). When an optical film in plane retardation $R_e$ is equal to half of the designated wavelength, this film is called a half wave plate (HWP) for this specific wavelength and $R_e = \lambda/2$. If $R_e$ is equal to a quarter of the designated wavelength, this film is called a quarter wave plate (QWP) for this specific wavelength and $R_e = \lambda/4$. This is for light at the normal incident case, since $R_e$ only involves $n_x$ and $n_y$. Therefore, the normal incident s-polarized light passing through a HWP with the right orientation can be perfectly converted to p-polarization, and vice versa. In embodiments, desirable ranges of in-plane retardation ($R_e$) for optical films are greater than about $(3/8+n)*\lambda$ but less than about $(5/8+n)*\lambda$, or greater than about $(7/16+n)*\lambda$ but less than about $(9/16+n)*\lambda$, or about $(1/2+n)*\lambda$. Here $\lambda$ is the wavelength of the source light, and n is 0 or any integer number. In embodiments, n is 0 (and the film is a HWP or HWP equivalent).

In a windscreen, the optical film used to rotate or convert the polarization will often directly contact either the polymer layer or the glass, so it is necessary and desirable to make the optical film invisible. The optical film may be used in the entire windscreen, or it may only be present in a portion of the windscreen, such as in the windscreen only in front of the driver or on the driver's side. Having a refractive index of the optical film that is equal or very similar to the refractive index of either the polymer layer material (such as PVB) or glass may be desirable for some applications, while in other applications, it is not necessary. Examples of materials that may be used for the optical film include, but are not limited to, cellulose ester optical films, such as cellulose triacetate (CTA), cellulose acetate propionate (CAP), cellulose acetate butyrate (CAB), and the like. In embodiments, the cellulose ester optical films may have a refractive index in the range of about 1.47 to 1.57. Other materials having an appropriate refractive index value as well as other necessary and desirable properties may be used as well, such as polycarbonates, co-polycarbonates, cyclic olefin polymers ("COP"), cyclic olefin copolymers ("COC"), polyesters, co-polyesters, and combinations of the foregoing polymers.

When an optical film is used in a windscreen to rotate or convert polarization, it has to survive lamination between glass (or other substrates). Lamination of a windscreen typically involves high temperature and high pressure, such as in an autoclave process. In order to maintain the retardation level of $R_e$ to be close to $\lambda/2$ (or $\lambda/4$) after autoclaving, the glass transition temperature ("$T_g$") or melt temperature ("$T_m$") of the optical film must be higher than the autoclave temperature. It is desirable if the $T_g$ (or $T_m$) of the optical film is at least 15° C. higher, at least 20° C. higher, at least 25° C. higher, or more, to maintain the properties of the optical film after lamination. The higher the $T_g$ (or $T_m$) of the optical film, the better the final optical properties of the optical film after autoclave. If the $T_g$ (or $T_m$) of the optical film is too close to the autoclave temperature, it is likely that the optical properties of the optical film will be changed or adversely impacted. Autoclave temperature will vary depending on the particular polymer layers and optical films used. Different polymer layers having different glass transition temperatures require different autoclave settings. Industrial standard autoclave temperatures used for windscreens are generally in the range of about 135 to 145° C., although other temperatures may be used depending on the materials and other factors known to one skilled in the art.

In embodiments, the polymer in the optical film has at least one of the following properties (i) to (iv): a glass transition temperature ($T_g$) or a melting point ($T_m$) greater than 150° C., or greater than 155° C., or greater than 160° C. or more; (ii) a dimension change of less than 2.5%, or less than 2.0%, or less than 1.5%, or less than 1.4%, or less than 1.3%, or less than 1.2% in either the machine direction or cross machine direction; (iii) a dimension change of less than 2.5%, or less than 2.0%, or less than 1.5%, or less than 1.4%, or less than 1.3%, or less than 1.2% in both the machine direction and cross machine direction, or (iv) the absolute value of the difference between the machine direction dimension change and the cross machine direction dimension change is less than 2.5%, or less than 2.0%, or less than 1.5%, or less than 1.4%, or less than 1.3%, or less than 1.2% as further described below.

The optical film must also be compatible with the polymer layer and remain stable over time so that it maintains its transparency, retardation uniformity, and other optical and mechanical properties. For example, in windscreens, the polymer layer(s) or at least one polymer layer is often plasticized PVB. The optical film must be compatible with the polymer (such as PVB) and any plasticizer(s) used in the polymer layer(s). Examples of suitable materials that can be used for the optical film include, but are not limited to, cellulose esters, polycarbonates, co-polycarbonates, cyclic olefin polymers (COP), cyclic olefin copolymers (COC), polyesters, co-polyesters, polymerized thermotropic liquid crystals, dried lyotropic liquid crystals, and combinations of the foregoing polymers. Other materials having the desired properties may also be used, depending on the polymer layer, required temperatures, and other parameters.

An optical film may also be used in conjunction with a windscreen having a solar control film, such as an IR reflecting film (such as XIR™ automotive solar control film or other solar control film known in the art) that is laminated between two (or more) polymer layers, such as PVB. The solar control film may, for example, have one or more thin sputtered layers of a metal oxide, such as indium tin oxide ("ITO"), or multiple layers of inorganic and/or organic materials (such as metal oxides, metals, and the like) on a substrate such as polyethylene terephthalate ("PET") (which has a higher refractive index than PVB) or other known material.

The optical film can rotate the linear polarization of the light transmitted through the optical film. In embodiments, the disclosed optical film is a half wave plate (comprising a single layer of optical film), or it may comprise two quarter wave plates (QWP) or any other combination of wave plates laminated together (via an adhesive layer) to form a half wave plate. As described above, the optical film must be compatible with the polymer layer(s) materials (such as plasticizer) and the lamination conditions used to form the windscreen. When used, an adhesive used to bond two or more wave plates, such as two QWPs, together must be compatible with the optical film(s) as well as the polymer layer(s) and any other materials, and must not be visible in the final multiple layer panel. Examples of suitable adhesives include, but are not limited to, as acrylates, polyacrylates, polyurethanes, polybutenes, pressure sensitive adhesives, and any other suitable adhesive known in the art.

The optical film and the polymer layer(s) must also have good or acceptable interfacial adhesion between them, otherwise the integrity of a laminate will not be acceptable and/or there will be delamination of the laminate. Polymer layers, such as poly(vinyl acetal) polymers (such as PVB), often do not stick or adhere to many of the materials used in optical films. Therefore, there is a need to find a way to increase or improve the interfacial adhesion between the optical film and one or more polymer layers. In embodiments, the compressive shear adhesion between the layers is greater than about 5.5, or at least about 5.6, or at least about 5.7, or at least about 5.8, or at least about 5.9, or at least about 6.0, or at least about 6.5, or at least about 7.0, or at least about 7.5, or at least about 8.0, or at least about 8.5, or at least about 9.0 MPa or higher.

In embodiments, increasing the interfacial adhesion between the layers of non-similar materials can be improved, in some cases, by changing the type of plasticizer. For example, using a different plasticizer either alone or in combination with a more conventional plasticizer, may help to improve the interfacial adhesion, as discussed further below.

In other embodiments, use of an adhesion promoter may help to improve interfacial adhesion between dissimilar materials. As used herein, an "adhesion promoter" is any material that increases or improves the interfacial adhesion between two dissimilar materials, such as the polymer layer (i.e., PVB) and the optical film. Any adhesion promoter that improves the interfacial adhesion while not interfering with the properties of the polymer layer(s) and optical film may be used. In embodiments, examples of adhesion promoters include, but are not limited to, silanes, acrylates and methacrylates, acids, acid scavengers such as epoxide acid scavengers, and epoxy and the like. The adhesion promoter(s) can be blended into the material, incorporated into it prior to forming (such as extrusion), or added to or coated onto a surface or layer using methods known to one skilled in the art.

The laminated glass formed using the optical film may be used, for example, as an automobile windshield, and the final glazing must be free of undesirable optical defects, such as washboard defect, applesauce defect, or any other optical defects. The polymer layers used in the laminated glazing (such as the windscreen) can be formed from any suitable polymers known in the art, as further described below. The interlayer comprising the optical film and polymer layers may provide additional functionality to the windscreen, such as acoustic properties (or sound dampening ability), solar control (absorption and/or blocking or reflection of UV or IR light), and the like, so long as the added functionality or materials do not interfere with each other.

The optical film may be any thickness desired so long as the optical film has the ability to provide the desired rotation, and the optical properties are not adversely impacted. Depending on the overall multiple layer glazing thickness desired, the optical film thickness and polymer layer thicknesses can be selected accordingly.

In embodiments, a barrier or hard coating may be used to provide a barrier between layers. The barrier or hard coating may be any suitable barrier and/or hard coating known in the art that is compatible with the optical film and the interlayer (or any other layer with which it comes into contact) and has the ability to provide the necessary barrier and any other desired properties. The barrier coating may be applied to the surface(s) of the optical film through any coating method known in the art, such as wet coating, vacuum sputtering, atomic layer deposition, reactive plasma coating, layer by layer coating, combinations of methods, and the like. The barrier coating may be UV cured, thermally cured, radiation cured, chemically cross-linked, or any combination of curing methods as desired and appropriate.

When a barrier coating is applied to more than one surface of an optical film(s), such as to both sides of a half wave plate or to two sides of two quarter wave plates that contact the polymer layer(s), the coating may be the same or different on each side. In embodiments, the coatings may be different and may have different refractive indices to provide a refractive index step down layer between the optical film and the interlayer. If different polymer layers or interlayers are used, for example, the refractive indices may be different and it may be appropriate and desirable to have different coatings on each side of the optical film.

The coating(s) must have strong adhesion to both the optical film and the polymer layer or interlayer, and must also have low haze and low color so that it is not visible in the final interlayer composition or final application, such as the windscreen. Additionally, the coating must be uniform consistent, such as substantially free of any pinholes and free of cracking or other defects. The coating must also form a chemical barrier. In embodiments, the coating is cross-linked and/or is a hard coating, for example, having a hardness rating of 3H or above. The coating may be an organic coating, an inorganic coating, or a hybrid organic/inorganic coating as desired, depending on the desired properties. Examples of coatings that may be suitable include, but are not limited to, wet-coated polyacrylate coatings, vacuum sputtered silica coatings, crosslinked polymer coatings; radiation or thermally cured acrylate coatings; thermally cured sol gel coatings based on silicates, titanates, zirconates, or mixtures thereof; hybrid organic-inorganic sol gel materials; thermally cured siloxane hard coats; and thermally cured polyacrylate coatings and the like. Coated optical films that have a barrier coating applied to one or both sides may also be used. As long as the coating has the desired properties as previously described, it may be used.

The polymer layers according to various embodiments of the present invention can comprise one or more thermoplastic polymers. As used herein, the terms "polymer resin composition" and "resin composition" refer to compositions including one or more polymer resins. Polymer compositions may optionally include other components, such as plasticizers and/or other additives, as further described below. As used herein, the terms "polymer resin layer," "polymer layer," and "resin layer" refer to one or more polymer resins, optionally combined with one or more plasticizers, that have been formed into a polymeric coating, layer or sheet. Again, polymer layers can include additional additives, although these are not required. As used herein, the term "polymer layer" (and "polymer resin layer" and "resin layer") refers to a single or multiple layer polymer coating, layer or sheet suitable for use with at least one rigid substrate to form a multiple layer panel. The terms "coating", "layer" and "sheet" may be used interchangeably to mean a coating, layer or sheet of polymer material. The terms "single-sheet" polymer layer and "monolithic" polymer layer refer to polymer layers formed of one single resin sheet, while the terms "multiple layer" and "multilayer" polymer layer refer to polymer layers having two or more resin sheets coextruded, laminated, or otherwise coupled to one another.

The polymer layers described herein may include one or more thermoplastic polymers. Examples of suitable thermoplastic polymers can include, but are not limited to, poly (vinyl acetal) resins (such as PVB), polyurethanes ("PU"), poly(ethylene-co-vinyl)acetates ("EVA"), polyvinyl chlorides ("PVC"), poly(vinyl chloride-co-methacrylate), polyethylene, polyolefins, ethylene acrylate ester copolymers, poly(ethylene-co-butyl acrylate), silicone elastomers, epoxy resins, and acid copolymers such as ethylene/carboxylic acid copolymers and ionomers thereof, derived from any of the previously-listed polymers, and combinations thereof. In some embodiments, the thermoplastic polymer can be selected from the group consisting of poly(vinyl acetal) resins, polyvinyl chloride, and polyurethanes, or the resin can comprise one or more poly(vinyl acetal) resins. Although some of the polymer layers may be described herein with respect to poly(vinyl acetal) resins, it should be understood that one or more of the above polymer resins and/or polymer layers including the polymer resins could be included with, or in the place of, the poly(vinyl acetal) resins described below in accordance with various embodiments of the present invention.

When the polymer layers described herein include poly (vinyl acetal) resins, the poly(vinyl acetal) resins can be formed according to any suitable method. Poly(vinyl acetal) resins can be formed by acetalization of polyvinyl alcohol with one or more aldehydes in the presence of an acid catalyst. The resulting resin can then be separated, stabilized, and dried according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.). The resulting poly(vinyl acetal) resins may have a total percent acetalization of at least about 50, at least about 60, at least about 70, at least about 75, at least about 80, at least about 85 weight percent, measured according to ASTM D1396, unless otherwise noted. The total amount of aldehyde residues in a poly(vinyl acetal) resin can be collectively referred to as the acetal component, with the balance of the poly (vinyl acetal) resin being residual hydroxyl and residual acetate groups, which will be discussed in further detail below.

The polymer layers according to various embodiments of the present invention can further include at least one plasticizer. Depending on the specific composition of the resin or resins in a polymer layer, the plasticizer may be present in an amount of at least about 5, at least about 10, at least about 15, at least about 20, at least about 25, at least about 30, at least about 35, at least about 40, at least about 45, at least about 50, at least about 55, at least about 60 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the polymer layer includes two or more resins, the weight of plasticizer is compared to the combined amount of all resins present to determine the parts per hundred resin. Further, when the plasticizer content of a polymer layer is provided herein, it is provided with reference to the amount of plasticizer in the mix or melt that was used to produce the polymer layer.

As previously discussed, it is important that the polymer and any other materials in the polymer layer(s), such as plasticizer, are compatible with the optical films. The inventors have found that for optical films made of polymers such as cyclic olefin polymers, cyclic olefin co-polymers, polycarbonates, co-polycarbonates, (co)polyesters and the like, when the optical film is used with conventional plasticized polymer layers such as PVB, the optical film forms crazes or cracks due to the incompatibility with the plasticizer(s). Crazing or cracking of polymers in contact with plasticizers or solvents is well known and is a major problem in plastic products. Plasticizers or solvents can initiate or accelerate the process of polymer failure due to the formation of cracks or crazes in the presence of external and/or internal stresses, such as during autoclaving. Therefore, the plasticizer(s) selected for use with the optical film must be one that is compatible with both the polymer layers and the optical film.

In embodiments, depending on the type of optical film (and materials of construction), examples of suitable plasticizers include, but are not limited to, phosphates, mixtures of phosphates, mixture of phosphates and conventional plasticizers, as well any other plasticizers which will not attack the optical film and are known to one skilled in the art. Examples of phosphate plasticizers include, but are not limited to, resorcinol bis(diphenyl phosphate), tri-cresyl phosphate, cresyl diphenyl phosphate, triamyl phosphate, tris(2-chloroethyl) phosphate, tris(1,3-dichloro-2-propyl) phosphate, triethyl phosphate, trimethyl phosphate, triphenyl phosphate, tris(2-butoxyethyl) phosphate, 2-ethylhexyl diphenyl phosphate, tris(2-ethylhexyl) phosphate, tri-o-cresyl phosphate, tris(2-chloroethyl) phosphate, bisphenol-A bis(diphenyl phosphate), and mixtures of phosphates and other plasticizers, and combinations thereof. Phosphate plasticizers are particularly useful with cellulose ester films.

In other embodiments, conventional plasticizers may be used either alone or in combination with a second plasticizer. Examples of conventional plasticizers that may be used, depending on the polymer layer and optical film(s) selected can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. In some embodiments, the conventional plasticizer may be selected from the group consisting of triethylene glycol di-(2-ethylhexanoate) and tetraethylene glycol di-(2-ethylhexanoate).

In embodiments, examples of other plasticizers that may, in some cases, be used effectively include high RI plasticizers, which can include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates and toluates (RI of about 1.480 to about 1.550); and other specialty plasticizers (RI of about 1.490 to about 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. The high RI plasticizer may be selected from dipropylene glycol dibenzoate and tripropylene glycol dibenzoate, and/or 2,2,4-trimethyl-1,3-pentanediol dibenzoate. Benzoate plasticizers are particularly useful with cyclic olefin polymer and cyclic olefin copolymer films.

When the polymer layer includes a high RI plasticizer, such as a benzoate plasticizer, the plasticizer can be present in the layer alone or it can be blended with one or more additional plasticizers. The other plasticizer or plasticizers may also comprise high RI plasticizers, or one or more may be a lower RI plasticizer having a refractive index of less than 1.460. In some embodiments, the lower RI plasticizer may have a refractive index of less than about 1.450, less than about 1.445, or less than about 1.442 and can be selected from the group of conventional plasticizers listed previously. When a mixture of two or more plasticizers is used, the mixture can have a refractive index within one or more of the above ranges. Any mixture or blend can be used as long as it is compatible with the polymer layer(s) and optical film(s).

According to some embodiments, when a mixture or blend of two (or more) poly(vinyl acetal) resins are used in a layer, the first and second (and any additional) poly(vinyl acetal) resins in the polymer layers described herein can have different properties or compositions. For example, in some embodiments, the first poly(vinyl acetal) resin can have a residual hydroxyl content and/or residual acetate content that is at least about 2, at least about 3, at least about 4, at least about 5, at least about 6, or at least about 8 weight percent higher or lower than the residual hydroxyl content and/or residual acetate content of the second poly(vinyl acetal) resin. As used herein, the terms "residual hydroxyl content" and "residual acetate content" refer to the amount of hydroxyl and acetate groups, respectively, that remain on a resin after processing is complete. For example, polyvinyl butyral can be produced by hydrolyzing polyvinyl acetate to polyvinyl alcohol, and then acetalizing the polyvinyl alcohol with butyraldehyde to form polyvinyl butyral. In the process of hydrolyzing the polyvinyl acetate, not all of the acetate groups are converted to hydroxyl groups, and residual acetate groups remain on the resin. Similarly, in the process of acetalizing the polyvinyl alcohol, not all of the hydroxyl groups are converted to acetal groups, which also leaves residual hydroxyl groups on the resin. As a result, most poly(vinyl acetal) resins include both residual hydroxyl groups (as vinyl hydroxyl groups) and residual acetate groups (as vinyl acetate groups) as part of the polymer chain. The residual hydroxyl content and residual acetate content are expressed in weight percent, based on the weight of the polymer resin, and are measured according to ASTM D1396, unless otherwise noted.

The difference between the residual hydroxyl content of the first and second poly(vinyl acetal) resins could also be at least about 2, at least about 5, at least about 10, at least about 12, at least about 15, at least about 20, or at least about 30 weight percent. As used herein, the term "weight percent different" or "the difference is at least weight percent" refers to a difference between two given weight percentages, calculated by subtracting the one number from the other. For example, a poly(vinyl acetal) resin having a residual hydroxyl content of 12 weight percent has a residual hydroxyl content that is 2 weight percent lower than a poly(vinyl acetal) resin having a residual hydroxyl content of 14 weight percent (14 weight percent–12 weight percent=2 weight percent). As used herein, the term "different" can refer to a value that is higher than or lower than another value.

At least one of the first and second poly(vinyl acetal) resins can have a residual hydroxyl content of at least about 14, at least about 14.5, at least about 15, at least about 15.5, at least about 16, at least about 16.5, at least about 17, at least about 17.5, at least about 18, at least about 18.5, at least about 19, at least about 19.5 and/or not more than about 45, not more than about 40, not more than about 35, not more than about 33, not more than about 30, not more than about 27, not more than about 25, not more than about 22, not more than about 21.5, not more than about 21, not more than about 20.5, or not more than about 20 weight percent, or in the range of from about 14 to about 45, about 16 to about 30, about 18 to about 25, about 18.5 to about 24, or about 19.5 to about 21 weight percent.

In embodiments, the other poly(vinyl acetal) resin(s) can have a residual hydroxyl content of at least about 8, at least about 9, at least about 10, at least about 11 weight percent and/or not more than about 16, not more than about 15, not more than about 14.5, not more than about 13, not more than about 11.5, not more than about 11, not more than about 10.5, not more than about 10, not more than about 9.5, or not more than about 9 weight percent, or in the range of from about 8 to about 16, about 9 to about 15, or about 9.5 to about 14.5 weight percent, and can be selected such that the difference between the residual hydroxyl content of the first and second poly(vinyl acetal) resin is at least about 2 weight percent, as mentioned previously. One or more other poly (vinyl acetal) resins may also be present in the polymer layer(s) can have a residual hydroxyl within the ranges provided above. Additionally, the residual hydroxyl content of the one or more other poly(vinyl acetal) resins can be the same as or different than the residual hydroxyl content of the first and/or second poly(vinyl acetal) resins.

In some embodiments, at least one of the first and second poly(vinyl acetal) resins can have a residual acetate content different than the other. For example, in some embodiments, the difference between the residual acetate content of the first and second poly(vinyl acetal) resins can be at least about 2, at least about 3, at least about 4, at least about 5, at least about 8, at least about 10 weight percent. One of the poly(vinyl acetal) resins may have a residual acetate content of not more than about 4, not more than about 3, not more than about 2, or not more than about 1 weight percent, measured as described above. In some embodiments, at least one of the first and second poly(vinyl acetal) resins can have a residual acetate content of at least about 5, at least about 8, at least about 10, at least about 12, at least about 14, at least about 16, at least about 18, at least about 20, or at least about 30 weight percent. The difference in the residual acetate content between the first and second poly(vinyl acetal) resins can be within the ranges provided above, or the difference can be less than about 3, not more than about 2, not more than about 1, or not more than about 0.5 weight percent. Additional poly(vinyl acetal) resins present in the resin composition or polymer layer can have a residual acetate content the same as or different than the residual acetate content of the first and/or second poly(vinyl acetal) resin.

In some embodiments, the difference between the residual hydroxyl content of the first and second poly(vinyl acetal) resins can be less than about 2, not more than about 1, not more than about 0.5 weight percent and the difference in the residual acetate content between the first and second poly (vinyl acetal) resins can be at least about 3, at least about 5, at least about 8, at least about 15, at least about 20, or at least about 30 weight percent. In other embodiments, the difference in the residual acetate content of the first and second poly(vinyl acetal) resins can be less than about 3, not more than about 2, not more than about 1, or not more than about 0.5 weight percent and the difference in the residual hydroxyl content of the first and second poly(vinyl acetal) resins can be at least about 2, at least about 5, at least about 10, at least about 12, at least about 15, at least about 20, or at least about 30 weight percent.

In various embodiments, the differences in residual hydroxyl and/or residual acetate content of the first and second poly(vinyl acetal) resins can be selected to control or provide certain performance properties, such as strength, impact resistance, penetration resistance, processability, or acoustic performance to the final composition, layer, or polymer layer. For example, poly(vinyl acetal) resins having a higher residual hydroxyl content, usually greater than about 16 weight percent, can facilitate high impact resistance, penetration resistance, and strength to a resin composition or layer, while lower hydroxyl content resins, usually having a residual hydroxyl content of less than 16 weight percent, can improve the acoustic performance of the polymer layer or blend.

Poly(vinyl acetal) resins having higher or lower residual hydroxyl contents and/or residual acetate contents may also, when combined with at least one plasticizer, ultimately include different amounts of plasticizer. As a result, layers or domains formed of first and second poly(vinyl acetal) resins having different compositions may also have different properties within a polymer layer. Although not wishing to be bound by theory, it is assumed that the compatibility of a given plasticizer with a poly(vinyl acetal) resin can depend, at least in part, on the composition of the polymer, and, in particular, on its residual hydroxyl content. Overall, poly (vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly (vinyl acetal) resins having lower residual hydroxyl contents may tend to, when plasticized with a given plasticizer, incorporate higher amounts of plasticizer, which may result in a softer polymer layer that exhibits a lower glass transition temperature than a polymer layer including a similar resin having a higher residual hydroxyl content. Depending on the specific resin and plasticizer, these trends could be reversed.

When two poly(vinyl acetal) resins having different levels of residual hydroxyl content are blended with a plasticizer, the plasticizer may partition between the polymer layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins.

In some embodiments, a polymer layer can include at least a first polymer layer comprising a first poly(vinyl acetal) resin and a first plasticizer, and a second polymer layer, adjacent to the first polymer layer, comprising a second poly(vinyl acetal) resin and a second plasticizer. The first and second plasticizer can be the same type of plasticizer, or the first and second plasticizers may be different. In some embodiments, at least one of the first and second plasticizers may also be a blend of two or more plasticizers, which can be the same as or different than one or more other plasticizers. When one of the first and second poly(vinyl acetal) resins has a residual hydroxyl content that is at least 2 weight percent higher or lower than the residual hydroxyl content of the other, the difference in plasticizer content between the polymer layers can be at least about 2, at least about 5, at least about 8, at least about 10, at least about 12, or at least about 15 phr. In most embodiments, the polymer layer that includes the resin having a lower hydroxyl content can have the higher plasticizer content. In order to control or retain other properties of the polymer layer or interlayer, the difference in plasticizer content between the first and second polymer layers may be not more than about 40, not more than about 30, not more than about 25, not more than about 20, or not more than about 17 phr. In other embodiments, the difference in plasticizer content between the first and second polymer layers can be at least about 40, at least about 50, at least about 60, or at least about 70 phr.

Glass transition temperature, or $T_g$, is the temperature that marks the transition from the glass state of the polymer to the rubbery state. The glass transition temperatures of polymer resins and polymer layers may be determined by dynamic mechanical thermal analysis (DMTA). The DMTA measures the storage (elastic) modulus (G') in Pascals, loss (viscous) modulus (G") in Pascals, and the tan delta (G"/G') of the specimen as a function of temperature at a given oscillation frequency and temperature sweep rate. The glass transition temperature is then determined by the position of the tan delta peak on the temperature scale. Glass transition temperatures using this method are determined at an oscillation frequency of 1 Hz under shear mode and a temperature sweep rate of 3° C./min. Alternatively, depending on the sample type and size, other methods of $T_g$ measurement may be used, as further described below.

Compressive shear adhesion ("CSA") measurements help characterize the level of adhesion between materials. CSA measurements are made with an Alpha Technologies T-20 Tensometer equipped with a special 45° compressive shear sample holder or jig. The laminate is drilled into at least five 1.25 inch diameter discs and kept at room temperature for 24 hours before performing the CSA test. To measure the CSA, the disc is placed on lower half of the jig and the other half of the jig is placed on top of the disc. The cross-head travels at 3.2 mm/min downward causing a piece of the disc to slide relative to the other piece. The compressive shear strength of the disc is the maximum shear stress required to cause the adhesion to fail (measured in mega pascals ("MPa")).

One or more polymer layers described herein may include various other additives to impart particular properties or features to the interlayer. Such additives can include, but are not limited to, adhesion control agents ("ACAs"), dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers.

The polymer layers described above may be produced according to any suitable method. In various embodiments, the method for producing these polymer layers can include providing two or more poly(vinyl acetal) resins, blending at least one resin and, optionally, at least one plasticizer or other additive, to form a blended composition, and forming a polymer layer from the blended composition.

In some embodiments, the resins provided in the initial steps of the method can be in the form of one or more poly(vinyl acetal) resins, while, in other embodiments, one or more resin precursors can also be provided. In some embodiments, when two or more poly(vinyl acetal) resins are physically blended, the blending of the two resins can comprise melt blending and may be performed at a temperature of at least about 140, at least about 150, at least about 180, at least about 200, at least about 250° C.

The resulting blended resins can then be formed into one or more polymer layers according to any suitable method. Exemplary methods of forming polymer layers can include, but are not limited to, solution casting, compression molding, injection molding, melt extrusion, melt blowing, and combinations thereof. Multilayer polymer layers including two or more layers may also be produced according to any suitable method such as, for example, co-extrusion, blown film, melt blowing, dip coating, solution coating, blade, paddle, air-knife, printing, powder coating, spray coating, and combinations thereof. In various embodiments of the present invention, the polymer layers may be formed by extrusion or co-extrusion. In an extrusion process, one or more thermoplastic polymers, plasticizers, and, optionally, at least one additive, can be pre-mixed and fed into an extrusion device. Other additives, such as ACAs, colorants, and UV inhibitors, which can be in liquid, powder, or pellet form, may also be used and may be mixed into the thermoplastic polymers or plasticizers prior to entering the extrusion device. These additives can be incorporated into the polymer resin and, by extension, the resultant polymer layer or sheet, thereby enhancing certain properties of the polymer layer and its performance in the final multiple layer glass panel or other end product.

In various embodiments, the thickness, or gauge, of any the polymer layers can be any desired thickness. For example, in embodiments, on one or both sides of the optical film, the polymer layer may be a relatively thin polymer coating layer that is at least about 10 microns (μm), at least about 15 μm, at least about 20 μm, at least about 30 μm, at least about 40 μm or more. In other embodiments, the polymer layer may be at least about 10 mils (0.25 mm), at least about 15 mils (0.38 mm), at least about 20 mils (0.51 mm) and/or not more than about 100 (2.54 mm), not more than about 90 (2.29 mm), not more than about 60 (1.52 mm), or not more than about 35 mils (0.89 mm), or it can be in the range of from about 10 to about 100 mils (0.25 to 2.54 mm), about 15 to about 60 (0.38 to 1.52 mm), or about 20 to about 35 mils (0.51 to 0.89 mm), although any thickness may be used depending on the desired application and properties. Any of the polymer layers can be single or monolithic polymer layers or coatings or multilayer polymer layers or coatings.

The polymer layer(s) and an optical film(s) are combined to form an interlayer. As used herein, "interlayer" refers to a first polymer layer, an optical film(s), and optionally, a second polymer layer, wherein the optical film(s) is adjacent the first polymer layer, and when there are two polymer layers, between the first and second polymer layers. Embodiments having one polymer layer and an optical film(s) adjacent the polymer layer, without a second polymer layer adjacent the other side of the optical film(s), may be referred to as a "bilayer." In some embodiments, the polymer layer utilized in a bilayer may include a multilayer polymer layer, while, in other embodiments, a monolithic polymer layer may be used. When the bilayer is used in a multiple layer panel or glazing, a second polymer layer is added prior to or during lamination. As previously described, the optical film may comprise one or more films that when combined, form a half wave plate.

Multiple layer panels as described herein can be used for a variety of end use applications, including, for example, for automotive windshields and windows, aircraft windshields and windows, panels for various transportation applications such as marine applications, rail applications, etc.

In certain embodiments, multiple layer panels may exhibit a reduction in interfering double or reflected "ghost" images when, for example, used for projecting a heads-up display (HUD) image onto the windshield of an automobile or aircraft. Typically, as previously discussed, ghost images are most problematic when the windshield has a generally uniform thickness profile, due to the differences in position of the projected image when it is reflected off the inside and outside surfaces of the glass. In some embodiments, however, multiple layer panels comprising the interlayers of the invention as described herein can minimize projection of ghost images such that, for example, the double image is reduced or eliminated.

The method of analyzing double image includes providing a multiple layer panel that includes at least a pair of rigid substrates and an interlayer as described herein disposed therebetween. The interlayer can include any properties of, or may be, any of the interlayers comprising an optical film(s) described herein. The substrates may also include one or more properties of the substrates described herein and, in certain embodiments, may comprise glass.

To analyze the double image of a given panel, a projection image can be generated by passing light through at least a portion of the panel. In some embodiments, the light passing through the panel includes an image such as, for example, a grid, a line, a shape, or a picture. In some embodiments, the image may be generated by reflecting a thin film transistor display off of a substantially flat mirrored surface, although other suitable methods of generating images may be used.

Figure 11:
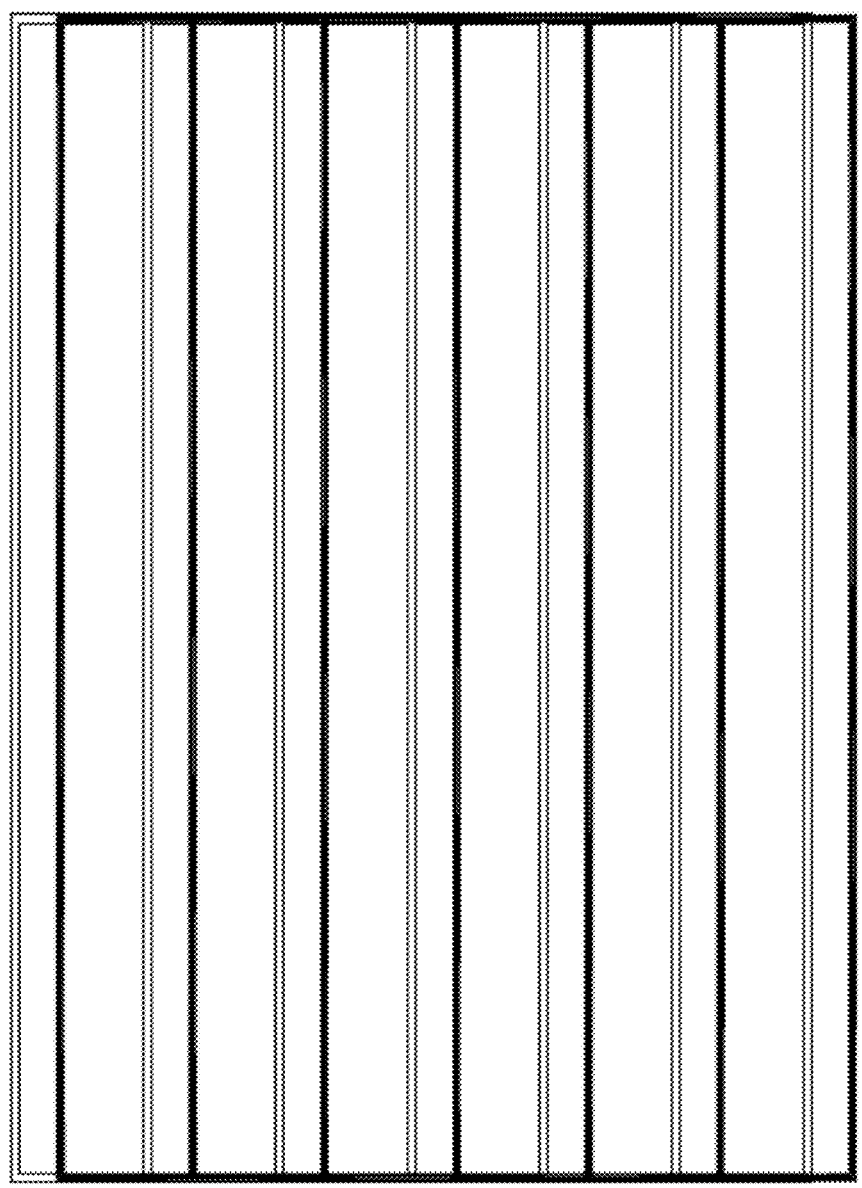
FIG. 11 shows a HUD test image generated with no polarization light with a ghost image clearly visible, where the darker lines are the primary image and the lighter lines are the second (ghost) image.

Once light has passed through and is reflected off the surfaces of the panel, the projection image can be projected onto a surface and then captured to form a captured image. In some embodiments, the projected image displayed on the surface may include a primary image and a secondary "ghost" image, off-set and slightly overlapping the primary image, as shown in FIG. 11. The projected image may be captured using a digital camera or other suitable device, and the capture may include digitizing the projected image to form a digital projection image comprising a plurality of pixels.

Figure 12:
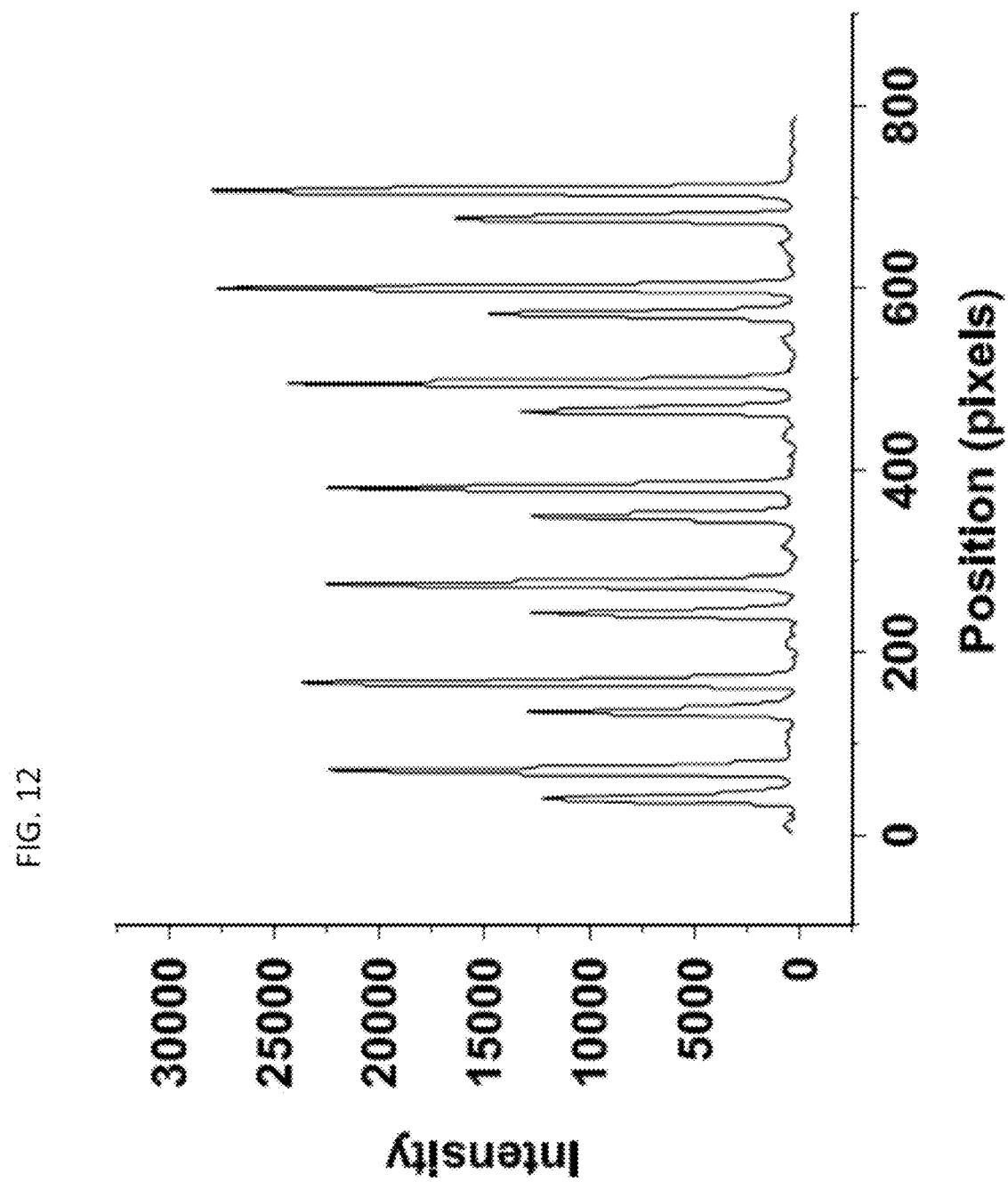
FIG. 12 is an example of a profile formed by analyzing a projection image (such as the image shown in FIG. 11) by plotting the intensity (grey scale level) along a vertical slice through the center of the images above as a function of position.

Once digitized, the captured image can be quantitatively analyzed to form a profile that includes at least one primary image indicator and at least one secondary image indicator. The analyzing may be performed by converting at least a portion of the digital projection image to a vertical image matrix that includes a numerical value representing the intensity of pixels in that portion of the image. A column of the matrix can then be extracted and graphed against pixel number, as shown in FIG. 12, to provide the profile. The primary image indicator of the profile can then be compared with the secondary image indicator of the profile to determine a difference. In some embodiments, the primary image indicator may comprise the higher intensity peaks of the graph, while the secondary image indicator may be the lower intensity peaks. Any suitable difference between the two indicators can be determined and, in some embodiments, can be the difference in position, or the difference in intensities between the two indicators in the profile graph. Based on the difference, the intensity ratio of the primary image to the second (ghost) image for each panel or portion of the panel being tested, can be calculated. In embodiments, the intensity ratio is greater than 5, greater than 10, greater than 20, greater than 30, greater than 40, greater than 50, or greater than 100.

When laminating the polymer layers or interlayers between two rigid substrates, such as glass, the process can include at least the following steps: (1) assembly of the two substrates and the interlayer comprising the polymer layers and optical film (and if necessary, adding a second polymer layer to a bilayer comprising a first polymer layer and an optical film(s)); (2) heating the assembly via an IR radiant or convective device for a first, short period of time; (3) passing the assembly into a pressure nip roll for the first de-airing; (4) heating the assembly for a short period of time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at a temperature between about 130° C. and 150° C. and pressures between 150 psig and 200 psig for about 20 to 90 minutes. Other methods for de-airing the interlayer-glass interface, as described according to some embodiments in steps (2) through (5) above include vacuum bag and vacuum ring processes, and both may also be used to form panels or windscreens of the present invention as described herein.

The following examples are intended to be illustrative of the present invention in order to teach one of ordinary skill in the art to make and use the invention and are not intended to limit the scope of the invention in any way.

EXAMPLES

The following Examples describe the preparation of several interlayers that include various polarization rotatory optical films and polymer layers. As described below, several tests performed on the interlayers were used to evaluate the optical properties of several comparative and inventive materials.

Example 1

An optical film was prepared by taking two quarter wave plate films made from a polycarbonate (Pure-ACE® W-142 film available from Teijin Limited) and combining the two quarter wave plates to form a half wave plate. The $T_g$ of the polycarbonate material used was about 225° C. The half wave plate optical film constructed was laminated between two pieces of glass and two sheets of 15 mils (0.38 mm) polyurethane (PU) polymer layers and put through an autoclave cycle having a maximum temperature of 140° C. and maximum pressure of 185 psi. The laminates were then placed into a HUD testing frame for ghost image analysis. A diagram of the test geometry of the laboratory set up for analyzing HUD ghost image is shown in FIG. 13. HUD images were generated using a standard TFT (thin film transistor) display which is reflected by a flat first surface mirror to the glass laminate, and the resulting HUD image was recorded using a digital camera (as previously described herein).

Figure 15:
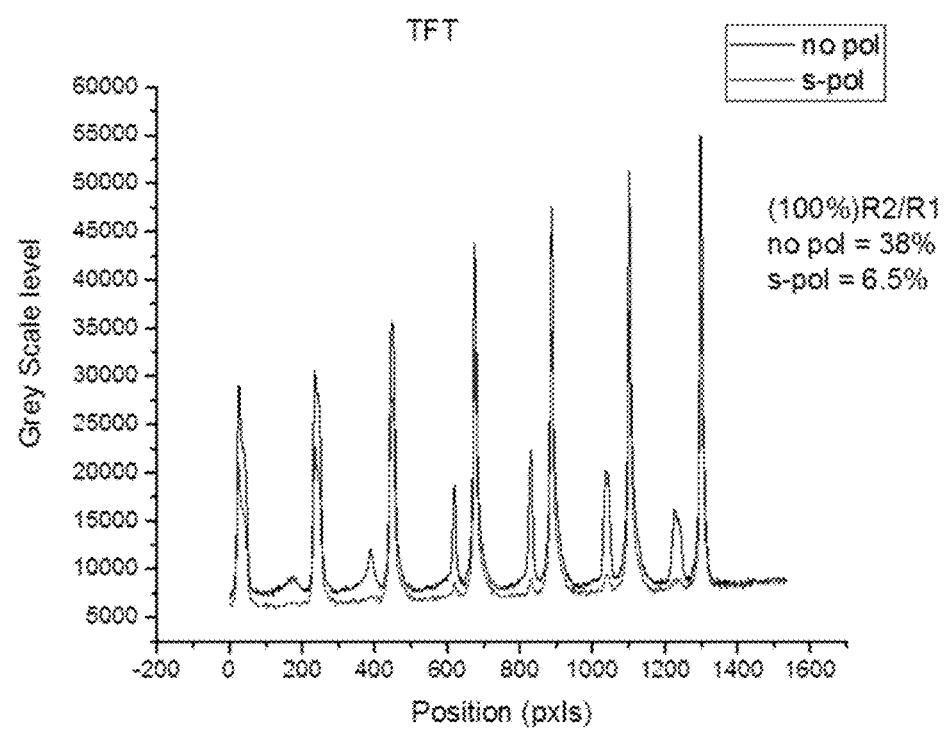
FIG. 15 shows a comparison of the intensity (grey scale level) along a vertical slice through the center of the test images as a function of position.

A HUD test image showing the primary and ghost images generated with no polarization incident light is shown in FIG. 14(a), and the ghost image is clearly visible. The same HUD test image showing the primary and ghost images generated with s-polarization incident light is shown in FIG. 14(b), where the ghost image intensity is greatly reduced compared to the image with no polarization light shown in FIG. 14(a). Comparison of the pixel intensities (grey scale level) along a vertical slice through the center of the test images is shown in FIG. 15. As shown in FIG. 15, the secondary (ghost) image peaks were greatly reduced for the s-polarization case in FIG. 14(b).

Example 2

Various polarization rotatory optical films of different materials and having different glass transition temperatures were obtained for testing. The optical films used were as follows: optical film 1 was a half wave plate comprising a cyclic olefin polymer (33 μm thickness); optical film 2 was a quarter wave plate comprising a cyclic olefin polymer (86 μm thickness); optical film 3 was a quarter wave plate comprising a polycarbonate resin film (75 μm thickness); optical film 4 was a quarter wave plate comprising a cellulose ester polymer (75 μm thickness); and optical film 5 was a half wave plate comprising a cellulose ester polymer (60 μm thickness). The $T_g$ of each optical film is shown in Table 1 below. The two cyclic olefin polymer films (of optical films 1 and 2) were different compositions, as were the cellulose ester polymer films (of optical films 4 and 5), as shown by the different $T_g$ values.

Laminates were constructed using optical films 1 to 5 described above. The laminates had the following structure: glass/polymer layer/optical film(s)/polymer layer/glass. The optical films were each placed between two pieces of glass (each 6"×6", 2.3 mm thick) along with two sheets of either polyurethane (PU) or commercially available PVB (Saflex™ R series using conventional 3GEH plasticizer) polymer layers (as shown in Table 1 below) and laminated using standard laminating procedures at an autoclave temperature of 143° C. to produce laminated glass samples. The laminated glass samples were evaluated visually for clarity and optical defects. The $T_g$ and shrink of each optical film were measured according to the procedure below. Results are shown in Table 1.

Each optical film was tested to determine the dimension change and the $T_g$ (or $T_m$) as follows: Dimension change test: a 20.00 cm×20.00 cm sample was cut from the optical film and placed on a Teflon™ coated flat metal substrate. The sample on the metal substrate was placed into an oven pre-heated to 150° C. After 30 minutes, the dimensions of the sample were measured. The dimension change (shrinkage or growth) was calculated as the percentage change of the length or width of the sample. The $T_g$ (or $T_m$) was measured by a Perkin Elmer Pyris Differential Scanning calorimeter (DSC) at a heating rate 10° C./min under nitrogen according to ASTM D3418-15.

TABLE 1

| Optical Films | Polymer Layer Type | Polarization Rotatory Characteristics of the Optical Films | Tg (° C.) | Dimension Change in Machine Direction (%) | Dimension Change in Cross Machine Direction (%) | Absolute Value of Difference in Dimension Change (%) | Results after autoclave |
|---|---|---|---|---|---|---|---|
| Optical film 1 | PU - 2 layers (0.015" each) | Half wave plate | 136.4 | 45.8 (shrink) | 33.3 (growth) | 12.5 | Severe washboard defects |
| Optical film 2 | PU - 2 layers (0.015" each) | Quarter wave plate | 163 | <0.2 | <0.2 | 0 | Free of washboard defects |
| Optical film 3 | PU - 2 layers (0.015" each) | Quarter wave plate | 225 | <0.1 | <0.1 | 0 | Free of washboard defects |
| Optical film 4 | PVB - 2 layers (0.015" each) | Quarter wave plate | 148.4 | 2.5 (shrink) | 1.7 (shrink) | 1.2 | Lightly visible washboard defects |
| Optical film 5 | PVB - 2 layers (0.015" each) | Half wave plate | 170 | <1.2 (shrink) | <1.2 (shrink) | 0 | Free of washboard defects |

As shown in Table 1, optical film 1 had severe washboard defects and very large dimension changes after lamination, and optical film 4 had lightly visible washboard defects and dimension changes of more than 1.5%, and in the machine direction, about 2.5%. Optical films 2, 3 and 5 were all free of washboard defects after lamination. Optical film 1 had a low $T_g$ of only about 136.4° C., which is less than normal lamination temperatures, and exhibited significant dimension changes in both the machine and cross machine directions (more than 30%). Optical film 4 had a $T_g$ of 148.4° C., which is only a few degrees higher than the autoclave temperature, and it exhibited a higher level of dimension change than optical films 2, 3 and 5, which all had minimal or very low percent dimension changes. Each of optical films 2, 3 and 5 had a $T_g$ at least 15° C. higher than the autoclave temperature and were free of washboard defects after lamination.

Figure 16:
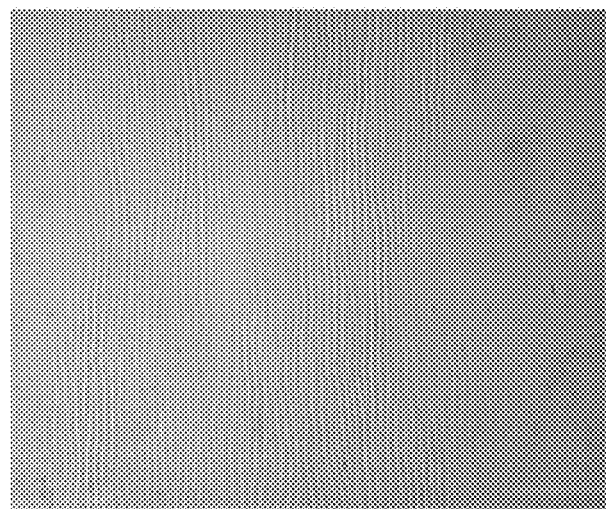
FIG. 16 shows a picture of a typical washboard defect in the laminated glass caused by the deformation of optical film during lamination (autoclave) process.

A picture of a typical washboard defect in a laminated glass sample is shown in FIG. 16. The washboard defect shown was observed by projecting a bright light through the laminate glass onto a white background. Such washboard defect was caused by deformation of the optical film, especially uneven deformation of the optical film in the machine direction and cross machine direction during the lamination (autoclave) process.

As shown by Example 2 and the results in Table 1 above, a polymer having low dimension change (shrink) (less than about 2.5%) and high $T_g$ (higher than lamination temperatures) can be successfully and advantageously used in an optical film and laminated at normal laminating conditions and be free of optical defects after lamination.

Example 3

Additional laminates were constructed in the same manner as those in Example 2. The laminates had the following structure: glass/PVB polymer layer/optical film/PVB polymer layer/glass. The optical film used in each of these examples comprised a cyclic olefin polymer of the same material as optical film 2 in Table 1 above. The PVB used in the polymer layers was mixed with a plasticizer or mix of plasticizers as shown in Table 2 below and formed into polymer layers or sheets. Each PVB layer was about 0.015 inch thick, and two PVB layers were used in each laminate. After lamination, each sample was checked visually for optical defects such as cracks, crazing or other defects.

TABLE 2

| | PVB Polymer Layers | | Results after |
|---|---|---|---|
| Examples | PVB resin | Plasticizer (phr) | autoclave |
| Example A | PVB resin with 18.5% PVOH | 3GEH (38 phr) | Film formed cracks and/or crazes |
| Example B | PVB resin with 18.5% PVOH | Dibutyl Sebacate (22 phr) | Film formed cracks and/or crazes |
| Example C | PVB resin with 18.5% PVOH | Benzoflex ™ 988 (40 phr) | Film was intact/free of optical defects |
| Example D | PVB resin with 10.5% PVOH | Benzoflex ™ 988 (20 phr) | Film was intact/free of optical defects |

TABLE 2-continued

| Examples | PVB Polymer Layers | | Results after autoclave |
|---|---|---|---|
| | PVB resin | Plasticizer (phr) | |
| Example E* | PVB resin with 24% PVOH | 60/40 Benzoflex ™ 988/3GEH (36 phr) | Film was intact/free of optical defects |
| Example F* | PVB resin with 24% PVOH | 70/30 Benzoflex ™ 988/3GEH (38 phr) | Film was intact/free of optical defects |
| Example G* | PVB resin with 24% PVOH | 80/20 Benzoflex ™ 988/3GEH (43 phr) | Film was intact/free of optical defects |

*The PVB polymer layers used in Examples E, F and G were acoustic trilayer products having a core layer comprising a low % PVOH resin, and the skin layers comprised 24% PVOH As shown in Table 2, above, the interlayers in Examples A and B, which comprised PVB plasticized with either 3GEH or dibutyl sebacate (conventional plasticizers used with PVB resin), did not perform well and the optical film exhibited cracking and crazing after lamination. Examples C to G, which comprised PVB plasticized with a benzoate based plasticizer or a mix of a benzoate based plasticizer and a conventional plasticizer, performed very well and the optical film remained intact and had no visual defects after lamination. The benzoate plasticizer used was Benzoflex™ 988, which is dipropylene glycol dibenzoate (commercially available from Eastman Chemical Company). The plasticizer mixing ratio of Benzoflex™ 988/3GEH in Table 3 was by weight.

Example 4

The following Example describes the preparation of several interlayers that include various polarization rotatory optical films and polymer layers and laminates comprising the interlayers. As described below, the laminated glass samples were evaluated to determine the interfacial adhesion between the polymer layers and optical film.

Polarization rotatory optical films were obtained and laminated between two pieces of glass with two polymer layers. The optical films used were quarter wave plates (QWP) comprising a cellulose ester (cellulose acetate propionate or CAP) polymer (75 μm thickness). The $T_g$ of the optical films was 153.5° C.

Laminates were constructed using the optical films described above. The laminates had the following structure: glass/PVB polymer layer/optical film(s)/PVB polymer layer/glass. The optical films were each placed between two pieces of glass (each 6"×6", 2.3 mm thick) along with two sheets of PVB polymer layers (having approximately 18.7 wt. % residual hydroxyl groups (or 10.5 wt. % in Sample 2) in the PVB resin) and plasticizer (conventional 3GEH plasticizer, resorcinol diphosphate (RDP) or a mixture of the two plasticizers, as shown in Table 3 below). An adhesion promoter (as detailed below and shown in Table 3) was used in some cases to help improve the adhesion between the optical film and the PVB layers. The adhesion promoter was either first dissolved or dispersed in plasticizer(s) and then mixed with PVB resin to form the PVB pre-mix, or it was added into the PVB resin directly and then mixed with plasticizers to form the PVB pre-mix. The PVB pre-mix was melt-blended in a lab Brabender mixer or extruder, and the melt was processed by melt press or extrusion into the polymer layers (15 mil thickness). The samples were laminated using standard laminating procedures at an autoclave temperature of 143° C. to produce laminated glass samples. The laminated glass samples were tested for adhesion using the compressive shear test previously described. Results are shown in Table 3.

The additives used were as follows: C501: poly(vinyl acetate-co-crotonic acid); PBEMA: poly(butyl methacrylate-co-ethyl methacrylate); APTES: 3-aminopropyltriethoxysilane; Silane 1: n-butylaminopropyltrimethoxysilane; Silane 2: 1-butanamine-4-(dimethyoxymethylsilyl)-2,2,-dimethyl; and MCS1562: epoxide acid scavenger.

TABLE 3

| Sample | Avg. Adhesion (MPa) | Amount of Additive (phr) | Additive | Plasticizer Used | Amount of Plasticizer (phr) |
|---|---|---|---|---|---|
| 1 | 3.4 | 0 | none | 3GEH | 38 |
| 2* | 8.0 | 0 | none | 3GEH | 25 |
| 3 | 4.4 | 3 | C501 | 3GEH | 38 |
| 4 | 4.6 | 6 | C501 | 3GEH | 38 |
| 5 | 4.3 | 10 | C501 | 3GEH | 38 |
| 6 | 4.2 | 2 | PBEMA | 3GEH | 38 |
| 7 | 3.6 | 4 | PBEMA | 3GEH | 38 |
| 8 | 3.6 | 6 | PBEMA | 3GEH | 38 |
| 9 | 4.0 | 10 | PBEMA | 3GEH | 38 |
| 10 | 3.4 | 0.4 | APTES | 3GEH | 38 |
| 11 | 6.3 | 0.1 | APTES | 3GEH | 38 |
| 12 | 3.5 | 0.2 | Silane 1 | 3GEH | 38 |
| 13 | 2.9 | 0.4 | Silane 1 | 3GEH | 38 |
| 14 | 3.2 | 1 | Silane 1 | 3GEH | 38 |
| 15 | 5.3 | 0.2 | Silane 2 | 3GEH | 38 |
| 16 | 6.0 | 1 | Silane 2 | 3GEH | 38 |
| 17 | 4.2 | 2 | Silane 2 | 3GEH | 38 |
| 18 | 16.4 | 2.5 | MCS1562 | RDP | 38 |
| 19 | 18.8 | 0 | none | RDP | 38 |
| 20 | 4.3 | 0 | none | 3GEH/RDP | 33/5 |
| 21 | 5.4 | 0 | none | 3GEH/RDP | 28/10 |
| 22 | 6.6 | 0 | none | 3GEH/RDP | 23/15 |
| 23 | 6.6 | 0 | none | 3GEH/RDP | 18/18 |
| 24 | 8.5 | 0 | none | 3GEH/RDP | 25/23 |
| 25 | 9.0 | 0 | none | 3GEH/RDP | 7.6/30.4 |

*resin is poly(vinyl butyral) having about 10.5 wt. % residual hydroxyl level

As shown in Table 3, the interlayer having only conventional plasticizer (3GEH) with the higher residual hydroxyl level PVB resin (18.7 wt. %) has very low interfacial adhesion (3.4 MPa) between the PVB and the optical film (Sample 1). Sample 2, which also had no additive or adhesion promoter, but used a lower residual hydroxyl PVB resin (10.5 wt. %) had very good interfacial adhesion (see Sample 2, 8.0 MPa). Samples 18 and 19, having RDP plasticizer with or without an epoxide acid scavenger, provided the highest interfacial adhesion between the PVB and the optical film (16.4 and 18.8 respectively). Additionally, in samples having a mix of plasticizers, such as a conventionally used plasticizer (3GEH) and RDP and no adhesion promoter, the interfacial adhesion is as high or higher than that of many of the samples with the conventional plasticizer and an adhesion promoter. In some cases, even a relatively high level of adhesion promoter did not significantly improve the interfacial adhesion between the polymer layer and the optical film (see, for example, Samples 5, 8 and 9, where 6 or 10 phr adhesion promoter was added but the interfacial adhesion was still less than 5 MPa).

Samples having compressive shear adhesion levels of at least about 5.5 or 6 MPa are fit for use as polymer layers in laminated glass applications. For comparison, polymer layers having compressive shear adhesion lower than about 5.5 MPa are not fit for use in the laminated glass application because the integrity of laminated glass cannot be maintained (the laminated glass will delaminate), and will not meet safety glass requirements such as impact performance.

Example 5

The following Example describes the preparation of several interlayers that include various polarization rotatory optical films having barrier coatings and polymer layers. Once the interlayers containing the polarization rotatory optical films were produced, the interlayers were then laminated between two pieces of glass and the laminates were evaluated visually after lamination.

A barrier coating solution was prepared as follows: 40.1 grams propylene glycol monomethyl alcohol, 1.66 g Irgacure® 184 (1-Hydroxy-cyclohexyl-phenyl-ketone non-yellowing photoinitiator available from CIBA), 0.42 grams Irgacure® 907 (2-Methyl-1[4-(methylthio)phenyl]-2-morpholinopropan-1-one photoinitiator available from BASF), 6.01 grams tricyclodecane dimethanol diacrylate (SR833S diacrylate monomer available from Sartomer), 11.99 grams pentaerythritol tri/tetra acrylate ("PETIA" available from Allnex) and 21.97 grams aliphatic urethane trifunctional acrylate (EBECRYL® 8701 available from Allnex) were mixed together at 25° C. using magnetic stirring for 30 min (until homogeneous) to form a coating solution. The coating solution was applied to one side of the QWP optical films listed below with a #6 wire-coated drawdown rod. After coating the QWPs, the coating was dried for 45 seconds in an oven at 104° C., then UV-cured by passage at 80 feet/minute underneath an H-bulb UV lamp at 100% output to afford a 4 micron coating on each QWP. The quarter wave plates coated were as follows: 1) polycarbonate (Pure-ACE® W-142 film available from Teijin Limited) about 76 microns and having a $T_g$ about 225° C.); 2) cyclic olefin polymer (COP) quarter wave plate film (ZEONOR® ZM16-138 available from ZEON) about 86 microns thick and having a $T_g$ about 163° C.); 3) vertical alignment cellulose acetate propionate (CAP) film (TacBright VM230D film available from TacBright Optonics Corp.) about 66 microns and having a $T_g$ about 153.5° C.

Pairs of the coated optical films described above were then assembled with PVB interlayers and two glass plies (as well as polyurethane to adhere the two QWPs to each other) to form an assembly structure as follows: glass//PVB//barrier coated QWP//PU//QWP barrier coated//PVB//glass, where PU refers to 15 mil (0.38 mm) Argotech AG8451 polyurethane adhesive film and where the optical axis of the QWP film was aligned at 45 degrees relative to the 4"×4" glass squares. The PVB was 15 mils (0.38 mm) Saflex® RK11, and this was used to laminate the coated QWPs (laminated together with the PU to form a half wave plate) to the glass. As shown in the assembly structure above, the coated optical films were oriented so that the barrier coated side of the QWPs was in contact with the PVB, and the non-barrier coated side of each QWP contacted the PU.

The assemblies were de-aired using vacuum bag de-airing at 105° C. and then put through an autoclave cycle having a maximum temperature of 143° C. and maximum pressure of 185 psi for one hour. The laminates were then inspected for optical quality. All laminates were visually clear with low haze and low color and no cracking or crazing or other signs of optical film degradation. After storing for four weeks at room temperature, the laminates were visually inspected again and showed no signs of optical film degradation.

The laminates containing the polycarbonate QWPs were tested for compressive shear adhesion using the test method previously described. The laminates were drilled into at least five 1.25 inch diameter discs and kept at room temperature for 24 hours before performing the CSA test. The laminates had a compressive shear adhesion (average) of 5.6 MPa with the failure occurring at the barrier film to PVB interface (as established by FTIR analysis).

This example demonstrates that use of a barrier coating applied onto the optical film successfully blocked the plasticizer in the PVB interlayer from migrating and attacking the optical film. By blocking plasticizer migration, haze, cracking, crazing, and other types of film degradation are eliminated. The interfacial adhesion between the barrier coating and PVB is acceptable and provides sufficient adhesion for a windscreen application. If necessary, the compressive shear adhesion and barrier coating properties can be further enhanced by modifying the barrier coating.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category can also be applied to species within the genus or members of the category unless otherwise noted.

What is claimed is:

1. An interlayer comprising:
   a first polymer layer comprising a poly(vinyl acetal);
   a polarization rotary optical film; and
   a second polymer layer comprising a poly(vinyl acetal);
   wherein the optical film is disposed between the first polymer layer and the second polymer layer, and
   wherein the optical film has a first barrier coating on a first side in contact with the first polymer layer and a second barrier coating on a second side in contact with the second polymer layer.

2. The interlayer of claim 1, wherein the optical film is selected from cellulose esters, polycarbonates, co-polycarbonates, cyclic olefin polymers, cyclic olefin copolymers, polyesters, co-polyesters, polymerized thermotropic liquid crystals, dried lyotropic liquid crystals and combinations thereof.

3. The interlayer of claim 1, wherein the first barrier coating comprises a UV curable coating.

4. The interlayer of claim 1, wherein the second barrier coating comprises a UV curable coating.

5. The interlayer of claim 1, wherein the first barrier coating is an acrylate coating.

6. The interlayer of claim 1, wherein the second barrier coating is an acrylate coating.

7. The interlayer of claim 1, wherein the first and second barrier coatings are the same.

8. The interlayer of claim 1, wherein the optical film comprises a half wave plate having the first barrier coating on the first side and the second barrier coating on the second side.

9. The interlayer of claim 1, wherein the compressive shear adhesion between the polymer layer and the optical film is at least 5.5 MPa (as measured by the compressive shear adhesion test).

10. The interlayer of claim 1, wherein the optical film comprises two quarter wave plates, and wherein each quarter wave plate has a barrier coating comprising the first barrier coating or second barrier coating on one side.

11. The interlayer of claim 10, wherein the two quarter wave plates are adhered to each other using an adhesive selected from polyurethanes, polyacrylates, polyesters, polybutenes, and the like and combinations thereof, and wherein the adhesive is not in contact with the barrier coating on the quarter wave plates.

12. A windshield comprising a pair of rigid substrates and the interlayer of claim 1, wherein the interlayer is disposed between the pair of rigid substrates.

13. The windshield of claim 12, wherein the windshield exhibits a projected image in which the intensity ratio of the primary image to the second (ghost) image is greater than 5.

14. An interlayer comprising:
a first polymer layer comprising a poly(vinyl acetal);
a polarization rotary optical film comprising a cellulose ester, a polycarbonate, a co-polycarbonate, a cyclic olefin polymer, a cyclic olefin copolymer, a polyester, a co-polyester, a polymerized thermotropic liquid crystal, a dried lyotropic liquid crystal and combinations thereof; and
a second polymer layer comprising a polymer other than a poly(vinyl acetal);
wherein the optical film is disposed between the first polymer layer and the second polymer layer, and
wherein the optical film has a first barrier coating on a first side in contact with the first polymer layer.

15. The interlayer of claim 14, wherein the first barrier coating comprises a UV curable coating.

16. The interlayer of claim 14, wherein the first barrier coating is an acrylate coating.

17. The interlayer of claim 14, wherein the second polymer layer is polyurethane or poly(ethylene-co-vinyl acetate).

18. An interlayer comprising:
a first polymer layer comprising a poly(vinyl acetal);
a polarization rotary optical film; and
a second polymer layer comprising a poly(vinyl acetal);
wherein the optical film is disposed between the first polymer layer and the second polymer layer, and
wherein the optical film has a first barrier coating on a first side in contact with the first polymer layer and a second barrier coating on a second side in contact with the second polymer layer, wherein the first barrier coating and the second barrier coating comprise a UV curable coating.

19. The interlayer of claim 18, wherein at least one of the first barrier coating and the second barrier coating is an acrylate coating.

20. A windshield comprising a pair of rigid substrates and the interlayer of claim 18, wherein the interlayer is disposed between the pair of rigid substrates,
wherein the windshield exhibits a projected image in which the intensity ratio of the primary image to the second (ghost) image is greater than 5.

* * * * *